United States Patent [19]
Derickson, III et al.

[11] 3,972,034
[45] July 27, 1976

[54] UNIVERSAL FIRST-IN FIRST-OUT MEMORY DEVICE

[75] Inventors: Richard B. Derickson, III; Krishna Rallapalli, both of San Jose, Calif.

[73] Assignee: Fairchild Camera and Instrument Corporation, Mountain View, Calif.

[22] Filed: May 12, 1975

[21] Appl. No.: 576,840

[52] U.S. Cl.............................. 340/173 R; 307/238; 328/37
[51] Int. Cl.².................................... G11C 13/00
[58] Field of Search................ 340/173 R; 307/238, 307/279

[56] References Cited
UNITED STATES PATENTS
3,736,575   5/1973   Mallerich........................ 340/173 R

*Primary Examiner*—Terrell W. Fears
*Attorney, Agent, or Firm*—Alan H. MacPherson; Henry K. Woodward; J. Ronald Richbourg

[57] ABSTRACT

A universal first-in first-out memory device is provided on a single semiconductor chip, which device may constitute a building block for digital systems. Provisions have been made in the device of this invention, as a result of unique circuit designs, to enable expansion of one memory device into an array of several memory devices to thereby expand the number of binary digits that can be stored, or the amount of data that can be stored in the array.

22 Claims, 11 Drawing Figures

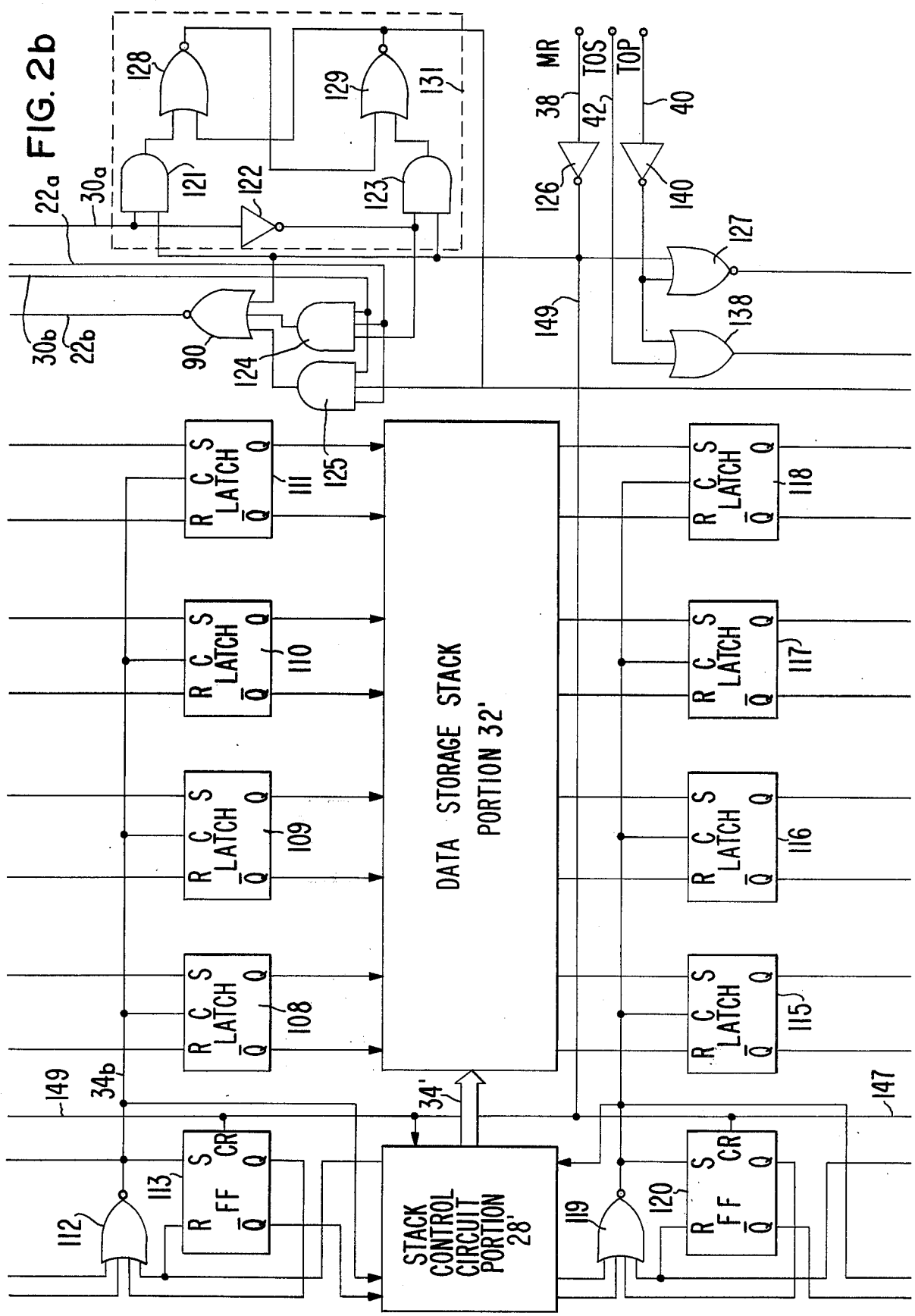

UNIVERSAL FIRST-IN FIRST-OUT MEMORY DEVICE

BACKGROUND OF THE INVENTION

1. Field of the Invention

This invention relates generally to building block components for use in high performance programmable digital systems, and in particular to a universal first-in first-out memory device integrated onto a single semiconductor chip.

2. Prior Art

In the past, digital systems have been fabricated from a multiplicity of logic circuits such as AND or OR gates, flip-flops, and the like. One or more such logic circuits are integrated onto a single semiconductor chip. These logic circuits are commonly referred to in the art as small scale integration. Numerous small scale integrated logic circuits are assembled onto a board containing printed circuit interconnections between each of the individual logic circuits, and numerous such assembled boards are electrically interconnected for constructing programmable digital systems. These digital systems have disadvantages of being large in size, requiring large amounts of power for operation, and are relatively slow in operation due to the physical distance between components.

More recently, typical circuits frequently employed in constructing digital systems have been integrated onto a single chip thereby mitigating somewhat the above-described disadvantages. One such example of such a typical integrated circuit is a multiplexer.

With recent improvements in integrated circuit technology, a still larger number of circuit components can be integrated onto a single semiconductor chip. Thus, larger portions of digital systems can be combined onto a single semiconductor chip. However, this improvement in the integrated circuit art has brought about different types of problems. For example, integrated circuits for digital systems were custom made for different applications, and the cost for such custom-made circuits is prohibitive. Also, with a larger number of circuits on a single semiconductor chip, a concomitant increase in the number of pin connections to the integrated circuit were required.

SUMMARY OF THE INVENTION

Accordingly, the present invention overcomes these more recent problems by providing a digital system building block designed on a system architecture level vis-a-vis circuit level. In addition, the number of pin connections have been reduced by employing unique circuit designs within the building block. Also, provisions have been made as a result of unique circuit designs to enable expansion of one building block into several building blocks to thereby expand the number of binary digits upon which operations can be performed, or the amount of data that can be stored.

A single chip large scale integration device is provided which comprises input means having control inputs, data inputs coupled to data input pins of the device, and data outputs, the input means being disposed for accepting data from an outside source on the data input pins, a data storage means having data inputs coupled to the data outputs of the input means and having data outputs thereof, the data storage means comprising an asynchronous circuit having a multiplicity of sets of individual storage devices and each of the sets of individual storage devices being adapted for accepting data only when in a neutral state, output means having control inputs, data inputs coupled to the data outputs of the storage means, and data outputs coupled to data output pins of the device, and circuit means having inputs coupled to control signal input pins of the device, and outputs coupled to the control inputs of the input and output means for independently controlling the loading of data into and the extraction of data from the memory, whereby data loaded into the input means asynchronously flows through the data storage means as a function only of data extracted from the output means.

BRIEF DESCRIPTION OF THE DRAWINGS

FIG. 2 is a unitary diagram showing the orientation of FIGS. 2a, 2b and 2c;

FIGS. 2a, 2b and 2c together illustrate a logic diagram of the memory device of this invention;

DETAILED DESCRIPTION

Figure 1:
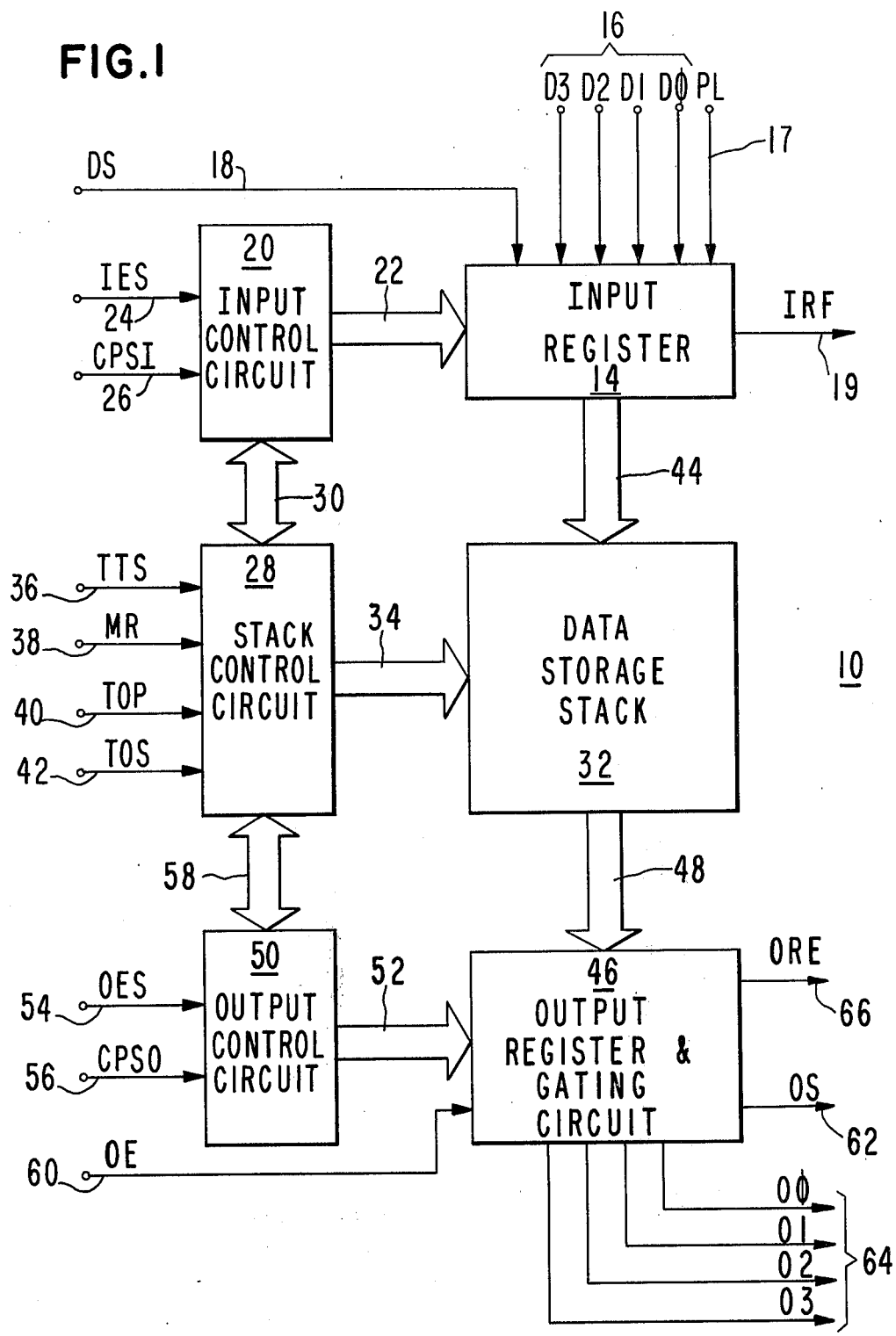
FIG. 1 is an overall block diagram of the universal first-in first-out memory device of this invention.

Referring now to FIG. 1, an overall block diagram is illustrated of a universal first-in first-out buffer memory device 10 constructed in accordance with the principles of this invention. The memory device 10 constitutes a building block for use in digital systems; as for example, but not limited to, calculators, microprocessors, data processing equipment, and other high performance programmable digital systems.

In one embodiment of the invention described hereinafter, input and output data refers to a binary number comprising four (4) binary digits; which is also referred to herein as a four-digit nibble of binary data. The term "nibble" is used herein to refer to a combination of four binary digits. Though one embodiment of this invention is illustrated and described for operations with four binary digits, it is possible for those skilled in the art to construct a memory device in accordance with the principles of this invention for operations with a larger number of binary digits, by employing different technologies, and different logic designs. Hence, the disclosed embodiment is by way of illustration only and is not limited to a design employing four-digit binary numbers. As will be set forth with greater particularity hereinbelow, a plurality of the memory devices 10 can be coupled together in parallel to form an array for operation with binary numbers having a larger number of digits, or in series to increase the storage capacity, or in a combined series-parallel array.

Data may be supplied to a memory device 10 in a parallel format or in a serial format. Likewise, data may be extracted from the memory device 10 in a parallel or serial format. A four-digit nibble of parallel data is supplied to an input register 14 by means of lines 16 (which are individually designated herein as D0, D1, D2 and D3) in conjunction with a parallel load (PL) signal supplied on a line 17. Serial input data (DS) is supplied to the input register 14 by means of a line 18. When four digits of binary data have been loaded into the input register 14, an input register full (IRF) output signal is supplied from the memory device on a line 19.

The input register 14 operates under the control of an input control circuit 20 by means of signals supplied on a control bus 22 between the control circuit 20 and the input register 14. Two circuit signals are supplied external from the memory device 10 to the input control circuit 20. That is, a serial input enable (IES) signal is supplied to the circuit 20 by means of a line 24; and, a serial input clock (CPSI) signal is supplied to the circuit 20 by means of a line 26.

Status and control signals are coupled between the input control circuit 20 and a stack control circuit 28 by means of a bus 30. The stack control circuit 28 controls the operation of a data storage stack 32 by means of signals supplied on a bus 34, and these signals are derived by the circuit 28 from control signals supplied external thereto. These external control signals comprise a transfer to stack (TTS) signal supplied on a line 36; a master reset (MR) pulse supplied on a line 38; a transfer out parallel (TOP) signal supplied on a line 40; and, a transfer out serial (TOS) signal supplied on a line 42.

Following a low-level master reset (MR) pulse supplied on the line 38, and the loading of data into the input register 14 (either serial or parallel) a low-level IRF signal is supplied on the line 19. A low-level TTS signal supplied on the line 36 will cause the four-digit binary number stored in the input register 14 to be transferred to the data storage stack 32 by means of a bus 44.

The term "stack" is employed herein in a conventional sense to mean a plurality of registers or latches coupled together in parallel. In one embodiment, stack 32 comprises fourteen sets of four latches per set, and each set is coupled in parallel to the next set of latches in the stack. However, this selection of 14 sets of latches is by way of example and not limitation. It is therefore feasible for one to construct a memory device of the present invention employing any number of sets of latches. Data transfers in parallel through the stack 32 asynchronously to the last set of latches not containing data. The fact that a set of latches contains data or not is stored in the stack control circuit 28. Accordingly, latch storage enable signals are supplied from the circuit 28 to the stack 32 by means of the bus 34.

The output of the data storage stack 32 is supplied to an output register and gating circuit 46 by means of a bus 48. The circuit 46 operates in response to control signals supplied from an output control circuit 50 by means of a bus 52. The control signals supplied on the bus 52 are derived in the output control circuit 50 from control signals supplied external thereto. These external control signals comprise an output enable serial (OES) signal supplied on a line 54, and a serial output clock (CPSO) signal supplied on a line 56. In addition, status and control signals are supplied between the output control circuit 50 and the stack control circuit 28 by means of a bus 58.

Data are supplied from the output register and gating circuit 46 in parallel format in response to a low-level signal supplied to the circuit 46 on an output enable (OE) input line 60. Data are supplied serially, in response to the OES and CPSO signals from the circuit 46 on a serial output (OS) line 62. Data are supplied from the device 10 in parallel on output lines 64 (which are individually designated herein as O0, O1, O2 and O3) in response to a low-level OE signal on the line 60. When the four-digit binary number previously stored in the output register is transferred out, by either lines 62 or 64, a low-level signal is supplied on an output register empty (ORE) line 66.

For a brief discussion of the operation of the memory device 10, assume that a low-level pulse is supplied on the master reset (MR) line 38 to reset all control circuitry (i.e., circuits 20, 28 and 50) of the device 10. For parallel operation, data are supplied on a line 16 to the input register 14. A high-level pulse is supplied on the line 17 to the input register 14 with the parallel data on the lines 16. Once data are stored in the input register 14 a low-level IRF signal is supplied on the line 19 indicating that the input register is full. Next, a low-level TTS signal is supplied on the line 36 to the stack control circuit 28 to enable transfer of the binary number stored in the input register 14 to the stack 32 by means of the bus 44. The IRF output signal line 19 may be coupled to the TTS input signal line 36 to effect automatic operation of the memory device. Data asynchronously passes through, or "falls through", the stack 32 to the output register and gating circuit 46. When data is loaded into the output register, the ORE output signal goes to a high level. This process can continue until the memory device 10 is full.

For serial operation, data are entered serially by means of the serial data (DS) line 18 to an input of the input register 14. A low-level IES signal supplied on the line 24 enables the serial input of data into the input register 14, and the CPSI clock signals supplied on the line 26 to the circuit 20 enables serially clocking of the data into the input register 14. Once four digits of binary data are entered into the input register 14, a low-level signal is supplied on the line 19 indicating that the input register 14 is full. Next, a low-level TTS signal is supplied on the line 36 to the stack control circuit 28 to enable transferring of the binary number (data) within the input register 14 to the stack 32 by means of the bus 44. As described above, data are asynchronously passed through the stack 32 to the last empty set of latches in the stack and to the output register.

Data may be extracted from the memory device 10 in either parallel or serial format. For parallel extraction of data from the memory device 10, a low-level signal is supplied on the line 60 to enable the output of the output register and gating circuit 46. The fact that data supplied on line 64 has been used can be communicated to the stack control circuit 28 by supplying a low-level signal on TOP input (line 40). This makes ORE (line 66) go low indicating that the output register 46 is empty. Now, a high-level signal supplied on TOP (line 40) will demand a new nibble from the stack 32 which is to be loaded into the output register 46. Each time a binary number is extracted from the output register and gating circuit 46, the binary number in the next position in the stack 32 is supplied to the output register and gating circuit 46 by means of the bus 48.

The CPSO clock signal is supplied on the line 56 to enable supplying data serially from the output register and gating circuit 46 on the serial data output (OS) line 62. Once data are extracted from the output register and gating circuit 46, then a low-level ORE signal is supplied on the line 66 to indicate that the output register is empty. The ORE output signal line 66 can be coupled to the TOS input signal line 42 to effect automatic operation of the memory device. The operation of the memory device 10 will be more fully understood following the detailed description of the individual circuits as set forth hereinbelow.

Figure 2A:
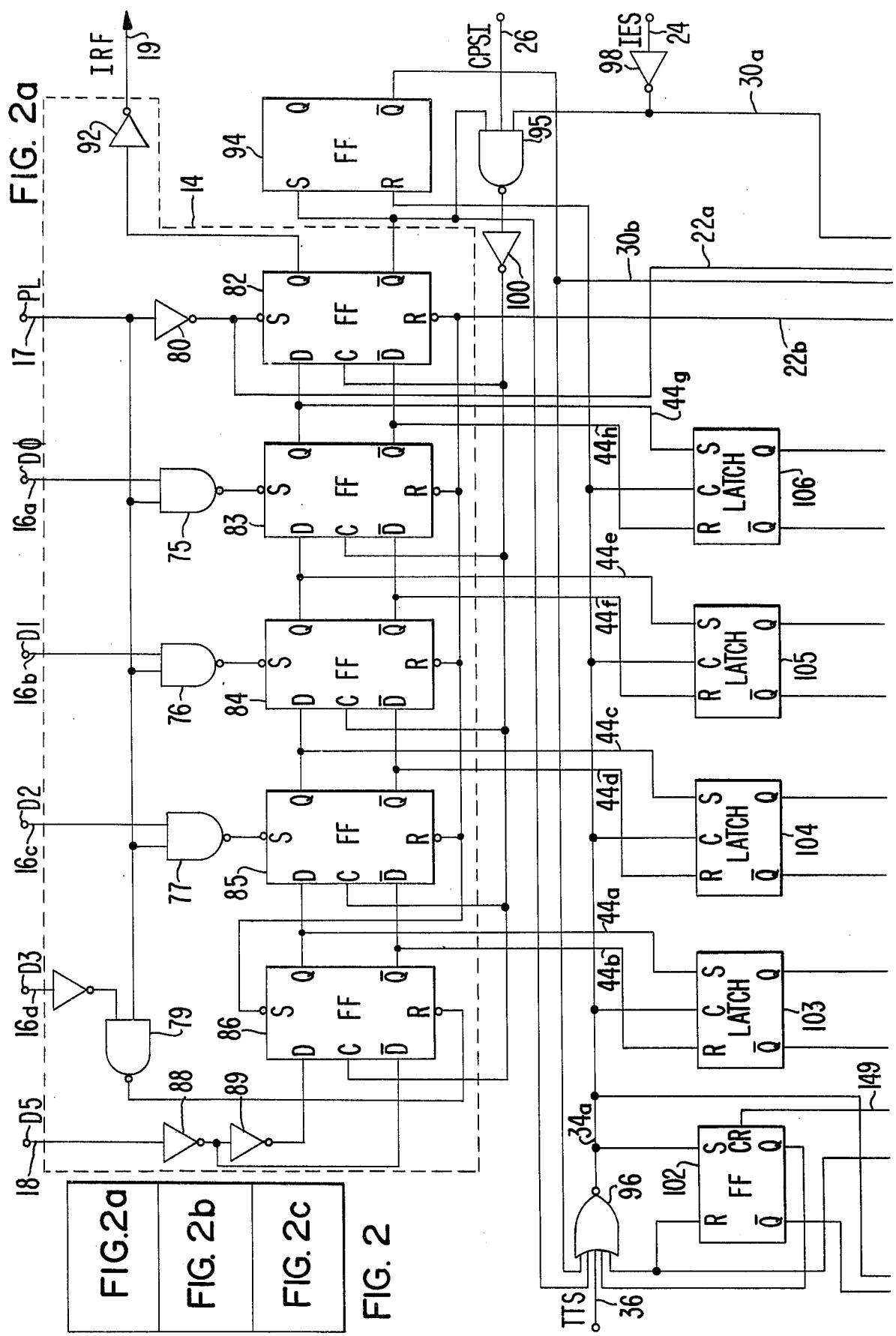
Figure 2C:
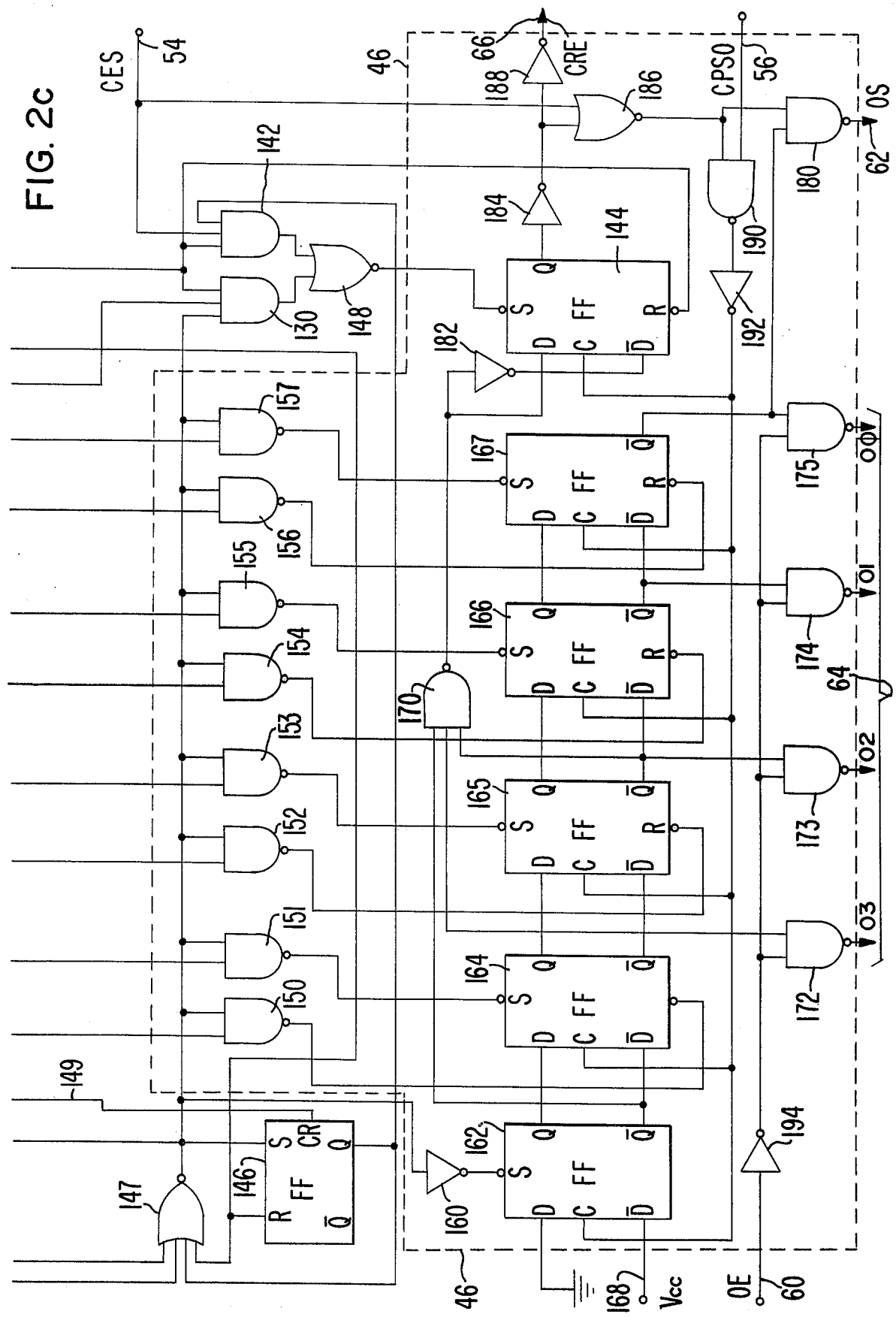

Referring now to FIG. 2, a unitary diagram is shown illustrating the orientation of FIGS. 2a, 2b, and 2c, which are set forth on three separate sheets hereof. A logic diagram of the memory device 10 of the present invention is illustrated in FIGS. 2a, 2b, and 2c. Although the various elements are shown in the form of classical logic components, it will be appreciated that these components are only representative of the electrical characteristics exhibited by various integrated circuit components and that the memory device 10 is preferably fabricated as an integrated circuit.

The input register 14 and portions of the input control circuit 20 are shown in FIG. 2a, wherein line 16a (which transmits data bit D0) of the lines 16 is coupled to the first of two inputs of a NAND gate 75. Lines 16b and 16c of the lines 16 (which transmit data bits D1 and D2) are coupled to the inputs of NAND gates 76 and 77, respectively. Line 16d of the lines 16 (which transmits data bit D3 of the input data) is coupled to the input of an inverter 78. The output of the inverter 78 is coupled to the first of two inputs of a NAND gate 79.

Line 17, which transmits the parallel load (PL) control signal, is coupled to the input of an inverter 80, and to the second inputs of the NAND gates 75 through 77 and 79. The output of the inverter 80 is coupled to the inverting set (S) input of a flip-flop 82, and to a line 22a of the bus 22. Inverting set (S) and reset (R) inputs, as referred to herein, mean that a low-level signal performs the specified operation.

The output of the NAND gates 75 through 77 are coupled to the inverting set (S) inputs of flip-flops 83 through 85, respectively. The output of the NAND gate 79 is coupled to the inverting reset (R) input of a flip-flop 86.

The line 18, which transmits the serial data (DS) input signal, is coupled to the input of an inverter 88. The output of the inverter 88 is coupled to the input of an inverter 89, and to the not data ($\overline{D}$) input of the flip-flop 86. The complement of a signal is designated as "not" signal name, and is represented herein by the signal abbreviation with an overscore. The output of the inverter 89 is coupled to the data (D) input of the flip-flop 86. The inverting reset (R) inputs of the flip-flops 82 through 85, and the inverting set (S) input of the flip-flop 86 are coupled to the output of a NOR gate 90 (FIG. 2b), which transmits an initialize signal to the input register 14 by means of a line 22b of the bus 22 (FIG. 1).

The true (Q) and not true ($\overline{Q}$) outputs of the flip-flop 86 are coupled to the data (D) and not data ($\overline{D}$) inputs of the flip-flop 85. In a similar manner, the Q and $\overline{Q}$ outputs of the flip-flop 85 are coupled to the D and $\overline{D}$ inputs of the flip-flops 84; the Q and $\overline{Q}$ outputs of the flip-flops 84 are coupled to the D and $\overline{D}$ inputs of the flip-flop 83; and, the Q and $\overline{Q}$ outputs of the flip-flop 83 are coupled to the D and $\overline{D}$ inputs of the flip-flop 82. The true (Q) output of the flip-flop 82 is coupled to the input of an inverter 92, and the output of the inverter 92 is coupled to the line 19, which transmits the input register full (IRF) output signal from the memory device 10.

The not true ($\overline{Q}$) output of the flip-flop 82 is coupled to the set (S) input of a flip-flop 94, to one of three inputs of a NAND gate 95, and to one of five inputs of a NOR gate 96. The line 26, which transmits the serial input clock (CPSI) signal, is coupled to a second input of the NAND gate 95. The line 24 which transmits the serial input enable (IES) signal is coupled to the input of an inverter 98. The output of the inverter 98 is coupled to the third input of the NAND gate 95, and to a line 30a of the bus 30. The output of the NAND gate 95 is coupled to the input of an inverter 100, and the output of the inverter 100 is coupled to the clock (C) inputs of the flip-flops 82 through 86.

The output of the NOR gate 96 is coupled to the set (S) input of a flip-flop 102, to the clock input of latches 103 through 106 by means of a line 34a of the bus 34, and to the reset (R) input of the flip-flop 94. The true (Q) output of the flip-flop 102 is coupled to an input of the NOR gate 96. The not true ($\overline{Q}$) output of the flip-flop 94 is coupled to an input of the NOR gate 96 and to a line 30b of the bus 30.

The true (Q) and not true ($\overline{Q}$) outputs of the flip-flop 86 are coupled to the set (S) and reset (R) inputs of the latch 103 by means of the lines 44a and 44b respectively, of the bus 44. In a similar manner, the Q and $\overline{Q}$ outputs of the flip-flops 85, 84 and 83 are coupled to the set (S) and reset (R) inputs of the latches 104 through 106 respectively, by means of lines 44c through 44h of the bus 44.

Referring now to FIG. 2b, in conjunction with FIG. 2a, the Q and $\overline{Q}$ outputs of the latches 103 through 106 are coupled to S and R inputs of latches 108 through 111, respectively. The output of the NOR gate 96 (FIG. 2a) is also coupled to the first of four inputs of a NOR gate 112 (FIG. 2b). The not true ($\overline{Q}$) output of the flip-flop 102 (FIG. 2a) is coupled to the second input of the NOR gate 112 (FIG. 2b). The output of the NOR gate 112 is coupled to the set input of a flip-flop 113, to the reset input of the flip-flop 102 (FIG. 2a), to an input of the NOR gate 96 (FIG. 2a), and by means of line 34b of bus 34 to the clock inputs of the latches 108 through 111 (FIG. 2b).

The output of the NOR gate 112 is also coupled to the input of a NOR gate (not shown) within the stack control circuit portion illustrated generally by the block 28'. The block 28' represents a repetition of a plurality of circuit elements identical to the NOR gate 112 and the flip-flop 113, and the outputs of the NOR gates in block 28' are coupled by means of a bus 34' which constitutes a portion of the bus 34, to the clock inputs of latches (not shown) within data storage stack portion 32', which constitutes a portion of the data storage stack 32. The stack portion 32' comprises sets of latches identical to latches 108 through 111.

The true (Q) output of the flip-flop 113 is coupled to an input of the NOR gate 112; and the output of the NOR gate not shown within the stack control circuit 28' is coupled to the reset input of the flip-flop 113, and to the fourth input of the NOR gate 112. The not true ($\overline{Q}$) output of the flip-flop 113 is coupled to the input of the NOR gate (not shown) within the stack control circuit portion 28'. The true (Q) and not true ($\overline{Q}$) outputs of the latches 108 through 111 are coupled to the set (S) and reset (R) inputs of latches (not shown) within the stack 32'.

The Q and Q̄ outputs of the previous set of latches (not shown) within the stack 32' are coupled to the S and R inputs of the last set of latches 115 through 118. The output of a NOR gate (not shown) within the stack control circuit 28', which corresponds to the NOR gate 112, is coupled to the first of four inputs of a NOR gate 119. The not true (Q̄) output of a flip-flop (not shown) within the circuit portion 28', which corresponds to the flip-flop 113, is coupled to the second input of the NOR gate 119. The output of the NOR gate 119 is coupled to the set (S) input of a flip-flop 120; to an input of the NOR gate (not shown) within the circuit 28' which corresponds to the NOR gate 112; to the reset (R) input of the flip-flop (not shown) within the circuit 28' which corresponds to the flip-flop 113; and by means of a line 34n of the bus to the clock inputs of the latches 115 through 118.

The line 30a, which is coupled to the output of the inverter 98 (FIG. 2a), is also coupled to the input of an AND gate 121 (FIG. 2b), and to the input of an inverter 122 (FIG. 2b). The output of the inverter 122 is coupled to the first of two inputs of an AND gate 123, and to the first of three inputs of an AND gate 124. The line 30b, which is coupled to the not true (Q̄) output of the flip-flop 94 (FIG. 2a), is coupled to the second input of the AND gate 124 (FIG. 2b), and to the first of three inputs of an AND gate 125. The line 22a from the output of the inverter 80 (FIG. 2a) is coupled to the second inputs of the AND gates 124 and 125. The line 38, which transmits the master pulse (MR) input pulse to the memory device 10, is coupled to the input of an inverter 126. The output of the inverter 126 is coupled to the first of two inputs of a NOR gate 127, to the second input of the AND gate 123, to the first of three inputs of the NOR gate 90, and to the second input of the AND gate 121. The outputs of the AND gates 124 and 125 are coupled to the second and third inputs of the NOR gate 90.

The output of the AND gate 121 is coupled to the first of two inputs of a NOR gate 128. The output of the NOR gate 128 is coupled to the first of two inputs of a NOR gate 129, and the output of the AND gate 123 is coupled to second input of the NOR gate 129. The output of the NOR gate 129 is coupled to the second input of the NOR gate 128, to the second input of the AND gate 125, and to the first of three inputs of an AND gate 130 (FIG. 2c). The AND gates 121 and 123, the inverter 122, and the NOR gates 128 and 129 with the connections therebetween, comprise a master latch circuit as illustrated within a dashed line 131.

The line 42, which transmits the transfer out serial (TOS) input signal, is coupled to the first of two inputs of an OR gate 138. The line 40, which transmits the transfer out parallel (TOP) input signal, is coupled to the input of an inverter 140. The output of the inverter 140 is coupled to the second input of the NOR gate 127 and to the second input of the OR gate 138. The output of the NOR gate 127 is coupled to the second input of the AND gate 130 (FIG. 2c), to the first of three inputs of an AND gate 142 (FIG. 2c), and to the inverting reset (R) input of a flip-flop 144 (FIG. 2c).

The output of the OR gate 138 (FIG. 2b) is coupled to the reset input of a flip-flop 146 (FIG. 2c), and to an input of a NOR gate 147 (FIG. 2c). The not true (Q̄) output of the flip-flop 146 is coupled to an input of the NOR gate 147, and to the third input of the AND gate 142. The output of the inverter 126 (FIG. 2b) is also coupled to a clear (CR) input of flip-flops 102 (FIG. 2a), 113 and 120 (FIG. 2b), 146 (FIG 2c), and to the corresponding flip-flops (not shown) in stack control circuit portion 28' by means of a line 149. The outputs of the AND gates 130 and 142 are coupled to the two inputs of a NOR gate 148, and the output thereof is coupled to the inverting set (S) input of the flip-flop 144.

The output of the NOR gate 147 (FIG. 2c) is coupled to the reset (R) input of the flip-flop 120 (FIG. 2b), to the fourth input of the NOR gate 119 (FIG. 2b), and to the set (S) input of the flip-flop 146. The output of the NOR gate 147 is also coupled to the first of two inputs of NAND gates 150 through 157, to the third input of the AND gate 130, and to the input of an inverter 160. The output of the inverter 160 is coupled to the inverting set (S) input of a flip-flop 162.

The not true (Q̄) outputs of latches 115 through 118 (FIG. 2b) are coupled to the second inputs of the NAND gates 150, 152, 154, and 156 (FIG. 2c). The true (Q) output of the latches 115 through 118 (FIG. 2b) are coupled to the second inputs of the NAND gates 151, 153, 155 and 157 (FIG. 2c). The output of the NAND gate 150 is coupled to the inverting reset (R) input of a flip-flop 164, and the output of the NAND gate 151 is coupled to the inverting set (S) input of the flip-flop 164. The output of the NAND gates 152 and 153 are coupled to the inverting reset (R) and set (S) inputs, respectively, of a flip-flop 165. The outputs of the NAND gates 154 and 155 are coupled to the inverting reset (R) and set (S) inputs, respectively, of a flip-flop 166. The outputs of the NAND gates 156 and 157 are coupled to inverting reset (R) and set (S) inputs, respectively, of a flip-flop 167.

The data (D) input of the flip-flop 162 is coupled to ground potential, and the not data (D̄) input of the flip-flop 162 is coupled to an internal source of positive voltage ($V_{cc}$) supplied on a line 168. The true (Q) output of the flip-flop 162 is coupled to the data (D) input of the flip-flop 164, and the not true (Q̄) output of the flip-flop 162 is coupled to the not data (D̄) input of the flip-flop 164, and to the first of three inputs of a NAND gate 170. The true (Q) outputs of flip-flops 164 through 166 are coupled to the data (D) inputs, respectively, of the flip-flops 165 through 167. The not true (Q̄) outputs of the flip-flops 164 through 166 are coupled to the not data (D̄) inputs of the flip-flops 165 through 167. The not true (Q̄) output of the flip-flop 164 is also coupled to the second input of the NAND gate 170, and to the first of two inputs of a NAND gate 172. The not true (Q̄) output of the flip-flop 165 is coupled to the third input of the NAND gate 170, and to the first of two inputs of a NAND gate 173. The not true (Q̄) output of the flip-flop 166 is coupled to the first of two inputs of a NAND gate 174, and the not true (Q̄) output of the flip-flop 167 is coupled to the first of two inputs of NAND gates 175 and 180.

The output of the NAND gate 170 is coupled to the D input of the flip-flop 144, and to the input of an inverter 182. The output of the inverter 182 is coupled to the not data (D̄) input of the flip-flop 144. The true (Q) output of the flip-flop 144 is coupled to the input of an inverter 184. The output of the inverter 184 is coupled to the first of two inputs of a NOR gate 186, and to the input of an inverter 188. The output of the inverter 188 is coupled to the line 66, which transmits the ORE output signal. Thus, in response to the two inverters 184 and 188, the status of the ORE output signal is equal to the status of the true (Q) output of the flip-flop 144.

The line 54, which transmits the serial output enable (OES) input signal, is coupled to the third input of the AND gate 142, and to the second input of the NOR gate 186. The output of the NOR gate 186 is coupled to the first of two inputs of a NAND gate 190, and to the second input of the NAND gate 180. The output line 62, which transmits the serial data output (OS), is coupled to the output of the NAND gate 180. The line 56, which transmits the serial output clock (CPSO) input signal, is coupled to the second input of the NAND gate 190. The output of the NAND gate 190 is coupled to the input of an inverter 192. The output of the inverter 192 is coupled to the clock inputs of the flip-flops 162, 164 through 167 and 144. The line 60, which transmits the output enable (OE) signal, is coupled to the input of an inverter 194, and the output of the inverter 194 is coupled to the second input of the NAND gates 172 through 175. The outputs of the NAND gates 172 through 175 are coupled to the lines 64. That is, the O0 parallel data output bit is supplied at the output of the NAND gate 175; the O1 bit is supplied from the NAND gate 174; the O2 bit is supplied from the NAND gate 173; and, the O3 bit is supplied from the NAND gate 172. The NAND gates 172 through 175 and 180 are three-state devices such that when the OE input signal is at a high level, the outputs thereof will be at a high impedance state.

Referring again to FIGS. 2a and 2b, the input register 14 is initialized in response to the master reset (MR) pulse supplied on the line 38 to the inverter 126 (FIG. 2b). A low-level master reset pulse effects a high-level signal at the output of the inverter 126 (FIG. 2b) and at an input of the NOR gate 90 (FIG. 2b). The output of the NOR gate 90 goes to a low-level, and this low-level signal is supplied on the line 22b to the inverting reset (R) inputs of flip-flops 82 through 85 (FIG. 2a), and to the inverting set (S) input of the flip-flop 86 (FIG. 2a). The master reset signal also clears the flip-flops 102 (FIG. 2a), 113 and 120 (FIG. 2b), 146 (FIG. 2c), and the corresponding flip-flops (not shown) in the stack control circuit portion 28'. Also, the MR pulse resets the flip-flop 144 (FIG. 2c) by means of NOR gate 127 (FIG. 2b). Accordingly, flip-flops 82 through 85 are reset, as well as the flip-flops in the stack control circuit, and flip-flop 86 is set in response to the low-level master reset pulse. The set state of the flip-flop 86 comprises a "marker bit" to be used in the serial loading of data into the input register 14.

Figure 3:
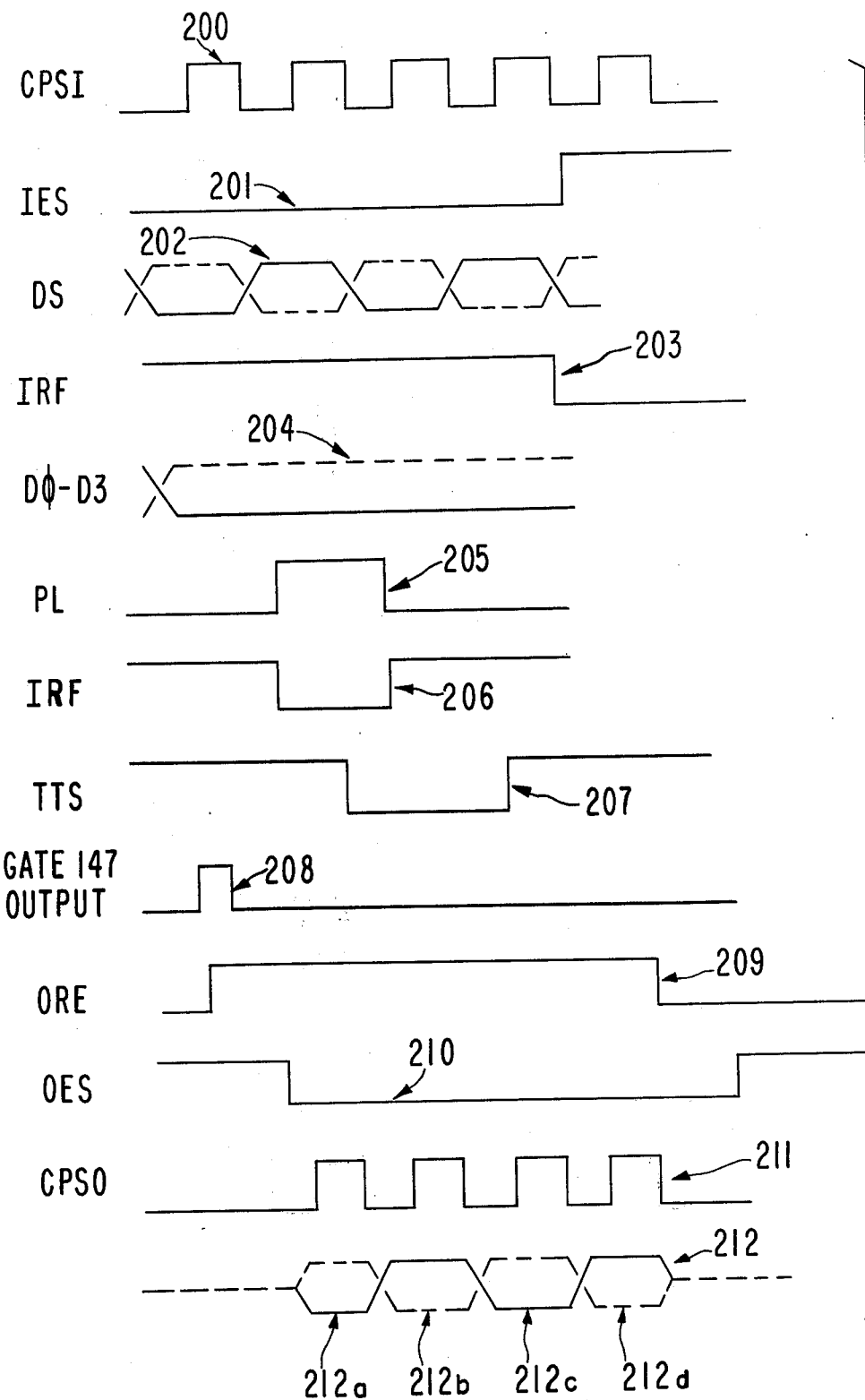
FIG. 3 is a conceptual timing diagram of the operation of the memory device shown in FIGS. 1, 2a, 2b and 2c.

Referring now to FIG. 3, a timing diagram of the operation of the memory device 10 is illustrated. Waveform 200 represents the serial input clock signal CPSI, which is supplied on the line 26 to the input control circuit 20. The CPSI signal effects clocking of the flip-flops 82 through 86 (FIG. 2a) to sequentially load serial data from the input line 18 into the input register 14. Due to the circuit configuration of gates 95 and 100, the negative transitions of the CPSI clock signal constitute the operative portions of this clock signal. That is, data is clocked into a given flip-flop on a negative transition of the CPSI clock signal.

Waveform 201 represents the serial input enable signal (IES), which is supplied on the input line 24 to the input control circuit 20. Waveform 202 represents serial data (DS) supplied on the line 18. Two possible states (a one: high-level; and a zero: low-level) are illustrated in the waveform 202; wherein a first possible state is illustrated by a solid line, and a second possible state is illustrated by a dashed line. Of course, any combination of ones and zeros are possible depending upon the binary number represented. When the IES signal is at a low-level, the CPSI signal is passed through the NAND gate 95 and the inverter 100 to the clock (C) inputs of the flip-flops 82 through 86. After the fourth negative transition of the CPSI clock signal, the marker bit (the original set state of flip-flop 86 following initialization) is clocked into the flip-flop 82. The states of the flip-flops 83 through 86 are determined by the respective states of the serial input data (waveform 202).

The true (Q) output of the flip-flop 82 was at a low-level from the time of initialization until the marker bit was clocked into this flip-flop. Accordingly, the output of the inverter 92 was at a high-level during this time interval, and will drop to a low-level when the marker bit is clocked into the flip-flop 82. The respective states of the output of the inverter 92 during a serial load of data into the input register 14, which comprises the input register full (IRF) output signal supplied on the line 19, is represented by waveform 203.

For parallel operation, the flip-flops 82 through 86 are set and reset after initialization in the same manner as described above. However, flip-flop 86 (FIG. 2a) will be either set or reset again in response to data supplied on the D3 line 16d. Hence, the marker bit must be set differently for parallel operation. Flip-flops 83 through 85 will be either set or reset according to the state of the data supplied on the D0 through D2 lines 16a through 16c, respectively. Note that the D3 data input line 16d is coupled to the inverting reset (R) input of the flip-flop 86. However, the data supplied on the line 16d will be in conformance with the data supplied on the lines 16a through 16c as a result of the data inversion effected by the inverter 78.

The flip-flops 83 through 86 will be either set or reset in accordance with the state of the data supplied on the lines 16 when a parallel load (PL) signal is supplied on the line 17 to enable the NAND gates 75 through 77 and 79. At the same time the PL signal is supplied on the line 17, flip-flop 82 will be set to establish the marker bit. Consequently, when flip-flop 82 is set simultaneously with the setting or resetting of flip-flops 83 through 86, a low level IRF signal is supplied on the line 19.

Waveform 204 (FIG. 3) represents a typical combined one or zero level of the parallel data supplied on the lines 16. Waveform 205 represents the parallel load (PL) signal occurring during the time that the parallel data (waveform 204) is in a steady state. Waveform 206 represents the IRF signal supplied on the line 19 during a parallel load operation of data into the input register 14.

Waveform 207 represents the transfer to stack (TTS) input signal supplied on the line 36 to the memory device 10. A low-level state of the TTS signal will effect setting or resetting of the latches 103 through 106 in accordance with the set or reset state, respectively, of the flip-flops 83 through 86. However, the TTS signal will only effect this transfer when the remaining four inputs of the NOR gate 96 are also at a low level. Two of the remaining four inputs to the NOR gate 96 will be at a low level as a result of both flip-flops 82 and 94 being in the set state (as described above).

Flip-flop 102 was reset (cleared) by the master reset signal, and the true (Q) output thereof is at a low level.

The not true ($\overline{Q}$) output of the flip-flop 102 is at a high level, and this will disable the NOR gate 112 (FIG. 2b). Thus, the output of the NOR gate 112, which is coupled to the remaining input of the NOR gate 96, is a low level. Consequently, the output of the NOR gate 96 goes to a high-level, which enables the loading of latches 103 through 106 with the data in the flip-flops 83 through 86, and also resets the flip-flop 94. Also, the flip-flop 102 is set as a result of the high-level output of the NOR gate 96. The true (Q) output of the flip-flop 102 goes to a high-level, which disables the NOR gate 96. Accordingly, the duration of the high-level output of the NOR gate 96 is a function of the time delay required to set the flip-flop 102.

When the output of the NOR gate 96 returns to a low level, and the flip-flop 102 is in a set state, then the NOR gate 112 (FIG. 2b) is enabled and a high-level signal is supplied on the line 34b to enable the latches 108 through 111. Accordingly, the data stored in the latches 103 through 106 (FIG. 2a) are transferred to the latches 108 through 111 (FIG. 2b). Also, when the output of the NOR gate 112 goes to a high level the flip-flop 102 (FIG. 2a) is reset and the NOR gate 96 is disabled. The high-level output of the NOR gate 112 also sets the flip-flop 113. The setting of flip-flop 113 disables the NOR gate 112 in the same manner as described above, and enables the next NOR gate (not shown) in the stack control circuit portion 28'. Accordingly, the data originally loaded into the input register 14 is transferred asynchroniously through each set of the latches within the stack 32 to the last set of latches 115 through 118, or to the last set of latches that does not contain data.

During the time that the flip-flop 94 (FIG. 2a) is set, which occurs when the flip-flop 82 is reset during initialization, AND gates 124 and 125 (FIG. 2b) are disabled. This provides a high-level output from the NOR gate 90 on the line 22b, which is the opposite state required for initialization of the input register 14. When the flip-flop 94 is reset as a function of the NOR gate 96 being enabled, a high-level signal is supplied on the line 30b to the inputs of the AND gates 124 and 125 (FIG. 2b), which will cause the output of the NOR gate 90 to drop to a low level. This low-level signal is supplied on the line 22b to the input register 14 to again initialize the flip-flops 82 through 86. Accordingly, it may be seen that the flip-flops 82 through 86 are initialized each time data is transferred from the input register to the set of latches 103 through 106.

It is conceivable that a user of the memory device 10 will apply a parallel load (PL) signal on the line 17 for a longer time duration that that required to load the input register 14. Thus, a provision is made to initialize the flip-flops 82 through 86 to the latches 103 through 106 only after the parallel load signal is removed from the line 17. In particular, the output of the inverter 80 is supplied by means of the line 22a to inputs of the AND gates 124 and 125 (FIG. 2b). That is, a high-level signal supplied on the line 17 will cause a low-level signal to be supplied on the line 22a to the inputs of the AND gate 124 and 125. Hence, these AND gates are disabled which will cause a high-level signal to appear to the output of the NOR gate 90. Therefore, the flip-flops 82 through 86 will not be initialized during the time interval that a high-level parallel load signal is supplied on the line 17.

If, for example, a transfer to stack (TTS) signal is supplied on the line 36 during the time interval that the high-level parallel load (PL) signal is supplied on the line 17, data will transfer from the flip-flops 83 through 86 to the latches 103 through 106 and the flip-flop 94 will be reset. The resetting of the flip-flop 94 remembers the fact that the transfer to stack operation has occurred. The high-level signal at the not true ($\overline{Q}$) output of the flip-flop 94 is supplied to the input of the AND gates 124 and 125. However, the AND gates 124 and 125 are still disabled as a function of a low-level signal on the line 22a (high-level parallel load signal). When the parallel load signal supplied on the line 17 drops to a low level the AND gates 124 and 125 will become enabled and a low-level signal will be supplied at the output of the NOR gate 90 on the line 22b to initialize the flip-flops 82 through 86.

After data has been loaded into the latches 115 through 118 (FIG. 2b) the flip-flop 120 is set and the output of the NOR gate 119 is at a low level. Thus, two of the four inputs of the NOR gate 147 (FIG. 2c) are at a low level. The flip-flop 146 is in a reset state as a function of the master reset signal supplied on the line 149 to the clear (CR) input of this flip-flop. Thus, the third input of the NOR gate 147 is also at a low level.

The normal state for the transfer out serial (TOS) and the transfer out parallel (TOP) input signals is that the TOS input is at a low level and the TOP input is at a high level. Accordingly, a low-level signal is supplied at the output of the gate 138 (FIG. 2b) which is supplied to the fourth input of the NOR gate 147 (FIG. 2c). Consequently, the output of the NOR gate 147 goes to a high level which enables NAND gates 150 through 157 to thereby transfer the contents of the latches 115 through 118 (FIG. 2b) to the flip-flops 164 through 167 (FIG. 2c). Also, a high-level signal at the output of the NOR gate 147 will set the flip-flop 162 (FIG. 2c) and will reset flip-flop 120 (FIG. 2b). In addition, a high-level signal at the output of the NOR gate 147 will enable the AND gate 130 and thereby disable the NOR gate 148. A low-level signal at the output of the NOR gate 148 will set the flip-flop 144. The setting of the flip-flop 144 will provide a high-level signal on the output register empty (ORE) output line 66, and in conjunction with a low-level output enable serial (OES) input signal supplied on the line 54, the NOR gate 186 is enabled. Enabling of the NOR gate 186 enables the NAND gate 190 to pass the CPSO clock signals supplied on the line 56 to the clock inputs of the flip-flops 144 and 162 through 167.

The set state of the flip-flop 162 constitutes a marker bit to be used in serial extraction of data from the output register 46. After each clock pulse supplied on the line 56, a zero is clocked into the flip-flop 162.

When the NOR gate 186 was enabled, the NAND gate 180 was likewise enabled. This allows the transferring out of data loaded into the flip-flop 167 since the not true ($\overline{Q}$) output of the flip-flop 167 is coupled to the second input of the NAND gate 180. On each subsequent clock signal supplied on the line 56, a subsequent digit of data is shifted through the flip-flops 162 through 167, and each one of these digits of the data are supplied from the output of the flip-flop 167 through the NAND gate 180 into the line 62. After three clock signals have been supplied on the line 156 the last digit of data loaded into the output register is supplied at the output of the NAND gate 180.

The marker bit originally loaded into the flip-flop 162 is now loaded into the flip-flop 166 and the flip-flops 162 through 165 are reset. Also at this time, the NAND gate 170 is enabled which resets the flip-flop 144 on the fourth negative transition of the CPSO clock signal. Resetting of the flip-flop 144 disables the NOR gate 186, supplies a low-level ORE signal on the line 66, and disables the NAND gates 180 and 190. Consequently, the marker bit which is present in the flip-flop 166 is never supplied onto the line 62.

In summary of the above-described operation reference is again made to FIG. 3, and in particular to waveform 208 which represents the output of the NOR gate 147. The high-level transition of the output of the NOR gate 147 effects the loading of data into the flip-flops 164 through 167 from the latches 115 through 118 (FIG. 2b). Also, the high-level signal appearing at the output of the NOR gate 147 enables the AND gate 130 which, in turn, disables the NOR gate 148. A low-level signal is thus supplied to the inverting set (S) input of the flip-flop 144, which sets this flip-flop, and a high-level signal appears on the output register empty (ORE) output signal line 66. The ORE output signal is represented in FIG. 3 by the waveform 209.

When the low-level signal is supplied on the output enable serial (OES) input line 54, which is represented by waveform 210 in FIG. 3, the nor gate 186 is enabled, which in turn enables the NAND gates 180 and 190. Accordingly, clock signals appear at the output of the inverter 192, which are represented by the waveform 211 in FIG. 3, to thereby clock the data loaded into the flip-flops 164 through 167 (including the marker bit loaded into the flip-flop 162) onto the OS line 62.

The serially extracted data appearing on the line 62 is represented in FIG. 3 by a waveform 212. The portion 212a of the waveform 212 represents the first digit of data output of the flip-flop 167, which has been transmitted through the NAND gate 180. Following the first negative transition of the CPSO clock signal (waveform 211) the second digit of data (portion 212b of waveform 212) appears at the output of the NAND gate 180. Likewise, following the second negative transition of the CPSO clock signal (waveform 211) the third digit of data (portion 212c of waveform 212) appears on the line 62. Following the third transition of the CPSO clock signal (waveform 211) the fourth bit of data (portion 212d of waveform 212) appears on the line 62. The fourth negative transition of the clock signal resets flip-flop 144 which causes the ORE output signal aappearing on the line 66 (waveform 209) to drop to a low level.

For parallel extraction of data from the output register 46 a low-level signal is supplied on the line 60 to enable the NAND gates 172 through 175. Accordingly, once data is loaded into the flip-flops 164 through 167, and the OE signal is at a low level, data are immediately transferred onto the lines 64 (O0, O1, O2 and O3) in parallel format.

A low-level TOP signal is supplied on the line 40 (FIG. 2b), which disables the NOR gate 127 thereby disabling the AND gates 130 and 142 (FIG. 2c). The outputs of the AND gates 130 and 142 cause the output of the NOR gate 148 to go to a high level. The output of the OR gate 138 (FIG. 2b) is at a high level in response to the low-level TOP signal, and this high-level signal from the OR gate 138 resets the flip-flop 146 (FIG. 2c) and disables the NOR gate 147. The low-level output signal from the NOR gate 127 (FIG. 2b) also operates to reset the flip-flop 144. Resetting of the flip-flop 144 provides a low-level ORE signal on the line 66, to indicate that the output register is empty.

Normally, the line 60, which transmits the OE signal, is coupled to ground potential when parallel extraction of data is generally performed. It is possible to couple the line 60, which transmits OE signal, and the line 40, which transmits TOP signal, together. Thus, when OE is at a low level data will be supplied on the lines 64 in a parallel format, and when the line 60 becomes high new data will be loaded into the output register 46 from the stack 32 without being supplied on the lines 64.

Figure 4:
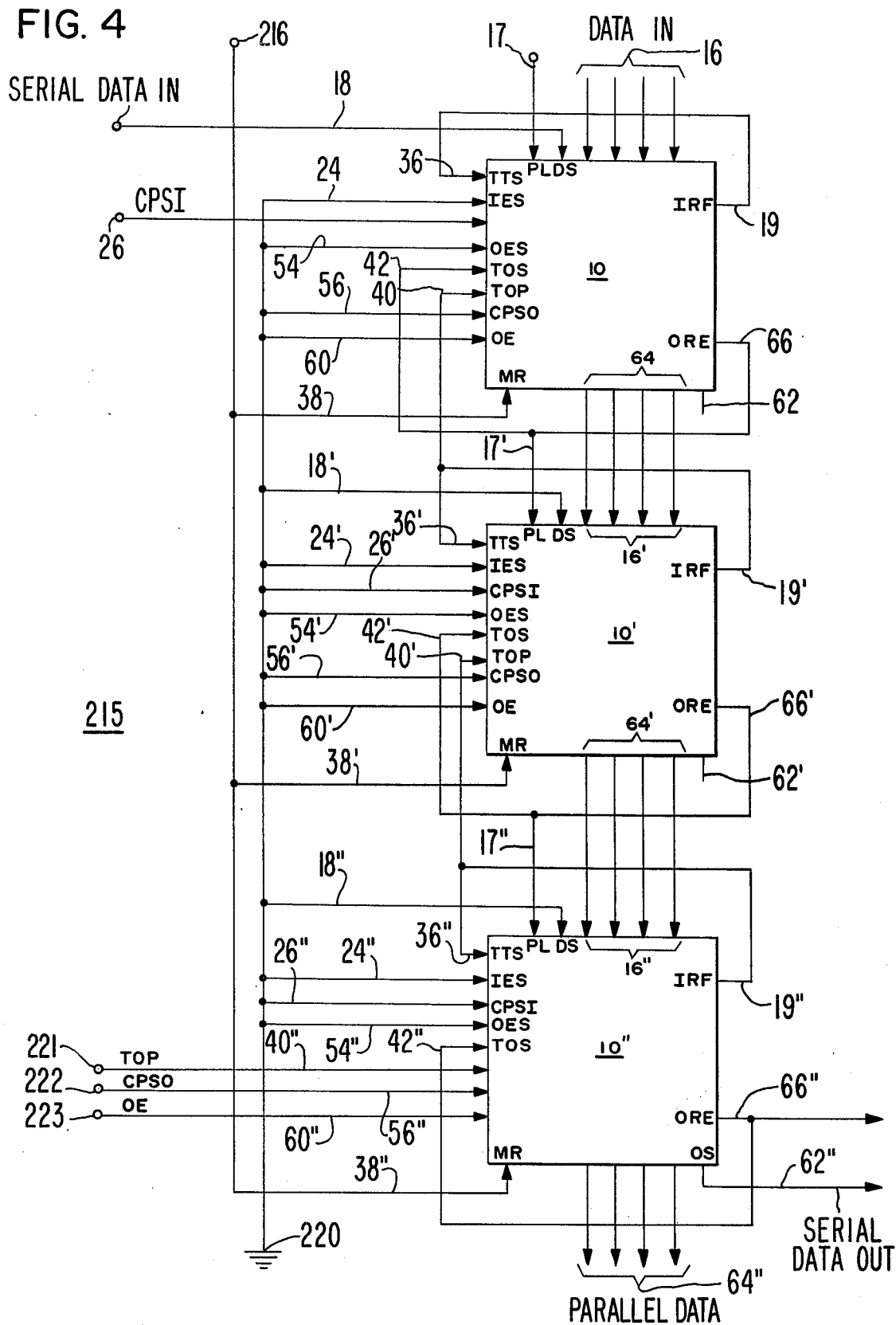
FIG. 4 is a block diagram of a vertical expansion array employing the memory device of this invention.

Referring now to FIG. 4, vertical expansion array 215 employing plurality of memory devices of the present invention is illustrated. In particular, three memory devices designated 10, 10' and 10" are coupled together to increase the storage capacity from 16 four digit nibbles in a single memory device to 46 4-digit nibbles in an array of three devices. In general, if $n$ devices are coupled together for vertical expansion the total storage capacity will be $15n+1$. Like reference numerals are employed in FIG. 4 to designate like parts described hereinabove, wherein all reference numerals associated with the memory device 10 are the same, reference numerals associated with the memory device 10' are the same as employed above but include a prime (') designation, and the reference numerals associated with the memory device 10" are the same but include a double prime (") designation.

The parallel data lines 16, the parallel load (PL) line 17, the serial data input line 18, and the serial input clock signal line (CPSI) 26 are all coupled to the memory device 10 in the same manner as that described hereinabove. The master reset (MR) input signal is supplied on a terminal 216, which is coupled to three memory devices 10, 10' and 10" by means of lines 38, 38' and 38", respectively. That is, the master reset lines 38, 38' and 38" are all coupled together to a single master reset input terminal 216 of the array 215. The input register full (IRF) signal line 19 of the memory device 10 is coupled directly to the transfer to stack (TTS) input signal line 36 of the memory device 10. Likewise, the output register empty (ORE) signal line 66 is coupled directly to the transfer out serial (TOS) input signal line 42 of the device 10, and to the PL input 17' of the device 10'. The serial output (OS) data lines 62 and 62' of the memory devices 10 and 10' are not connected since these outputs are not used on the input and intermediate devices of a vertical expansion array such as array 215.

The input enable serial (IES) input signal line 24, the output enable serial (OES) input signal line 54, the serial output clock (CPSO) input signal line 56, and the output enable (OE) input signal line 60 of the memory device 10 are all coupled to ground potential on a terminal 220. The serial data (DS) input line 18', the IES input signal line 24', the CPSI input signal line 26', the OES input signal line 54', the CPSO input signal line 56', and the OE input signal line 60' of the memory device 10' are also coupled to ground potential on the terminal 220. In addition, the DS input line 18", the IES input signal line 24", the CPSI input signal line 26", and the OES input signal line 54", of the memory device 10" are all coupled to ground potential on the terminal 220. The parallel data output lines 64 of the device 10 are coupled to the corresponding parallel input lines 16' of the device 10' and the parallel output lines 64' of the device 10' are likewise coupled to the parallel input lines 16" of the memory device 10". The parallel data output lines 64" of the device 10" constitutes the parallel data output of the array 215.

The input register full (IRF) output signal line 19' of the device 10' is coupled to the transfer out parallel (TOP) line 40 of the device 10, and to the transfer to stack (TTS) input signal line 36' of the device 10'. The output register empty (ORE) output signal line 66' of the device 10' is coupled to the transfer out serial (TOS) input signal line 42' of the device 10' and to the parallel load (PL) input signal line 17'' of the device 10''. Similarly, the input register full (IRF) output signal line 10'' of the device 10'' is coupled to the transfer out parallel (TOP) input signal on 40' of the device 10', and to the transfer to stack (TTS) input signal line 36'' of the memory device 10''.

The output register empty (ORE) output signal line 66'' of the device 10'' is coupled to the transfer out serial (TOS) input signal line 42'' of the memory device 10''. The serial output (OS) data line 62'' of the memory device 10'' constitutes the serial data output of the array 215. The transfer out parallel (TOP) input signal line 40'' of the memory device 10'' is coupled to an input terminal 221 of the array 215. The CPSO input signal line 56'' is coupled to a terminal 222 of the array 215; and, the output enable (OE) input signal line 60'' is coupled to an input terminal 223 of the array. A high-level ORE signal on line 66'' of device 10'' indicates that data is present in the output register of device 10''.

In operation, a master reset signal is first applied to each of the memory devices 10, 10' and 10'' by means of the line 38, 38' and 39''. Data is loaded into the memory device 10 by means of the lines 16 or 18 as described hereinabove. When a four-digit nibble of the data is loaded into the input register of the device 10, a low-level signal is supplied on the IRF output line 19. This signal is coupled directly to the TTS input signal line 36 of the device 10 to effect immediate transfer of the four-digit nibble to the stack within the device 10. This nibble of data asynchronously transfers through the stack within the device 10 and into the output register thereof.

When the four-digit nibble is loaded into the output register of the memory device 10, a high-level signal is supplied on the ORE Output signal line 66. The line 66 is coupled to the parallel load (PL) input 17' of the memory device 10' to effect immediate parallel transfer of the four-digit nibble from the memory device 10 to the memory device 10'. Also, the high-level signal on the output line 66 is coupled to the transfer out serial (TOS) input signal line 42 of the memory device 10. This high-level signal at the TOS input will reset the flip-flop 146 (FIG. 2c) and inhibit the NOR gate 147 (FIG. 2c) within the device 10. Thus, the next four-digit nibble in the stack 32 of the memory device 10 will not transfer to the output register thereof until the previous four-digit nibble is transferred to the device 10'. Accordingly, data automatically transfers from the output register of the memory device 10 to the input register of the device 10' as a function of the state of the ORE output signal on the line 66.

Once the four-digit nibble is loaded into the input register of the memory device 10', a low-level signal is supplied on the line 19' to the TOP input signal of the device 10 on the line 40, and to the TTS input signal of the device 10' on the line 36'. The low-level IRF signal from the memory device 10 will reset the flip-flop 146 (FIG. 2c) in the memory device 10, disable the NOR gate 147 (FIG. 2c) of the device 10, and terminate the high-level signal on the line 17' of the device 10'. This will effect a transfer of the four-digit nibble loaded into the input register of the device 10' to the data storage stack within the device 10'.

When the four-digit nibble is loaded into the output register of the memory device 10', a high-level signal appears on the ORE output signal line 66'. This high-level signal will enable parallel load of this four-digit nibble into the input register of the memory device 10'', and will reset a flip-flop in the device 10' corresponding to the flip-flop 146 (FIG. 2c). When the four-digit nibble is loaded into the input register of the memory device 10'', a low-level signal will be supplied on the line 19'' from the memory device 10'', which will also be supplied to the TOP input signal line 40', of the device 10'. In addition, the low-level signal supplied on the line 19'' will also be supplied to the TTS input of the memory device 10'' which will transfer the four-digit nibble from the input register of the device 10'' to the data storage stack therein. The four-digit nibble will asynchronously transfer through the stack within the device 10'' to the output register thereof. In response to the four-digit nibble being loaded into the output register within the device 10'', a high-level signal is supplied on the output signal line 66'' to indicate a data valid condition. The high-level signal supplied on the line 66'' is also coupled to the TOS input signal line 42'' of the device 10'' to reset a flip-flop in this device corresponding to the flip-flop 146 (FIG. 2c). Data is extracted from the memory device 10'' in the same manner as described hereinabove.

As stated hereinabove, the storage capacity of an array comprising $n$ memory devices is $15n+1$ nibbles of data. Assume, for example, that sixteen (16) nibbles of data have been loaded into the array 215 shown in FIG. 4 after initialization by a master reset (MR) pulse on the line 216. These sixteen nibbles of data asynchronously flow through the array 215 to the device 10''. At this time the first and sixteenth nibbles of data are loaded into the output and input registers respectively, of the device 10''. A low-level IRF signal is then supplied on the output line 19'' from the device 10'', which low-level signal is also coupled to the TOP input signal line 40'' of the device 10''. This will prevent the output register in the device 10' from loading with the next nibble of data (i.e., seventeenth nibble). Referring briefly to FIGS. 2b and 2c, a low signal supplied on line 40 will produce a high-level signal at the output of the inverter 140 (FIG. 2b), which high-level signal is coupled through the OR gate 138 (FIG. 2b) to an input of the NOR gate 147 (FIG. 2c). This high-level signal at the input of the NOR gate 147 inhibits transfer of the seventeenth nibble to the output register. Accordingly, device 10' can only accept 15 additional nibbles of data. In a similar manner, device 10 can only accept 15 nibbles of data once device 10' is loaded with data (i.e., input register of device 10' is full and a low-level IRF signal is supplied on the line 19').

Figure 5:
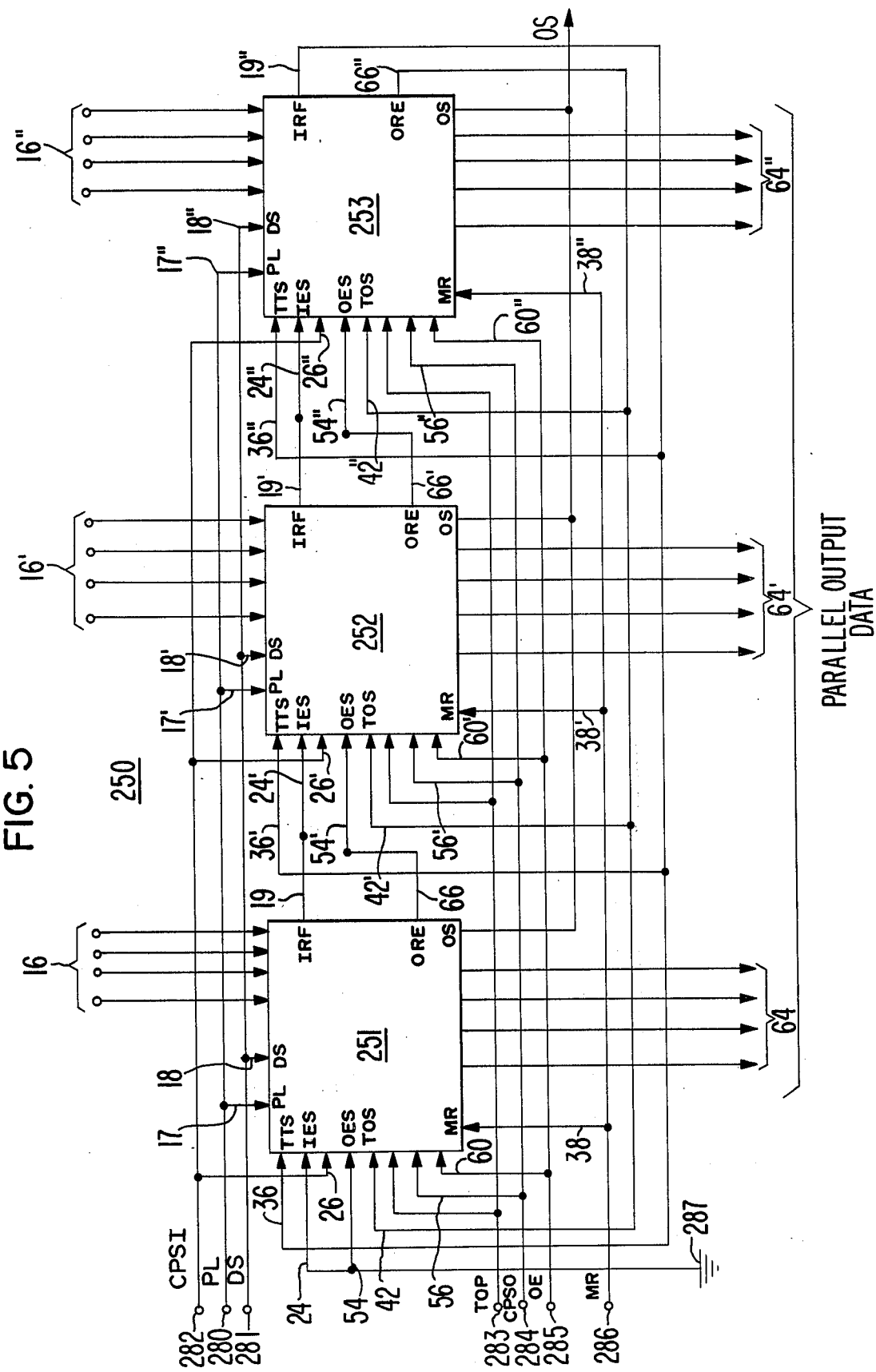
FIG. 5 is a block diagram of a horizontal expansion array employing the memory device of this invention.

Referring now to FIG. 5, a horizontal expansion array 250 of the memory device of the present invention is shown. In particular, three memory devices 251, 252, and 253 are coupled together to expand the length of a binary number from four digits to 12 digits (3×4 digits). The parallel data input lines 16, 16' and 16'' are coupled to the parallel data inputs of the memory devices 251 through 253, respectively. The parallel data output lines 64, 64' and 64'' are coupled to the parallel data outputs of the memory devices 251 through 253, respectively. The parallel load (PL) input signal lines 17, 17' and 17" for each of the memory devices are coupled to a terminal 280 of the array 250. The serial data (DS) input lines 18, 18' and 18" of each of the devices of the array 250 are coupled together on terminal 281. The serial input clock signal (CPSI) input lines 26, 26' and 26" are all coupled together on a single terminal 282 of the array. The transfer out serial (TOS) input signal lines 42, 42' and 42" are each coupled together to ORE line 66" of the device 253; the serial output clock signal (CPSO) input signal lines 56, 56" and 56" are all coupled to a termminal 284 of the array; and, the output enable (OE) input signal lines 60, 60' and 60" are coupled to an input terminal 285 of the array. The TOP inputs lines 40, 40' and 40" of devices 251, 252 and 253, respectively, are coupled to a terminal 283 of the array 250.

Similarily, the master reset (MR) input signal lines 38, 38' and 38" are coupled to an input terminal 286 of the array 250.

As will be explained in greater detail hereinbelow, memory device 251 operates as a row master of the array 250 while memory devices 252 and 253 operate as row slaves. The serial input enable (IES) line 24, and the output enable serial (OES) input signal line 54 are both coupled to ground potential on a terminal 287. This connection of terminals 24 and 54 to ground potential establish memory device 251 as the row master. The input register full (IRF) output signal line 19 of the memory device 251 is coupled to the IES signal line 24' of the device 252.

The ORE output signal line 66 of the device 251 is coupled to the OES input signal line 54' of the device 252. Similarily, the IRF output signal line 19' of the device 252 is coupled to the IES input signal line 24" of the device 253, and the ORE output signal line 66' is coupled to the OES input signal line 54" of the device 253. The IRF output signal line 19" of the device 253 is coupled to the TTS input signal lines 36, 36' and 36" of the devices 251 through 253. Likewise, the ORE output signal line 66" of the device 253 is coupled to the TOS input signal lines 40, 40' and 40" of the devices 251 through 253.

For a description of the operation of the array illustrated in FIG. 5, reference is made to FIGS. 2a, 2b and 2c in conjunction with FIG. 5. A twelve-digit binary number is loaded into the array 250 in parallel by means of lines 16, 16' and 16" in response to a single parallel load (PL) input signal supplied on the terminal 280. When the input registers in each of the three devices of the array are loaded with data, the IRF output signals from each of the devices will drop to a low level. The low-level IRF output signals from the devices 251 and 252 are supplied directly to the IES inputs of the devices 252 and 253, respectively. This coupling is employed for interlocking the respective devices 251 through 253 to effect synchronized operation of the array 250, which will be explained in greater detail hereinbelow. The low-level IRF output signal from the device 253 is coupled to the TTS inputs of all the devices in the array to effect simultaneous transfer of the twelve-digit binary number to the respective data storage stacks in the devices of the array 250.

For serial loading of data into the array illustrated in FIG. 5, data is supplied sequentially serial by digit, serial by nibble and number onto the terminal 281. The first four digits of data supplied onto the terminal 281 are loaded into the input register of the device 251. Note that the IES input signal line 24 of the device 251 is coupled to ground potential. Thus, the NAND gate 95 (FIG. 2a) within the device 251 is enabled (flip-flop 82 was reset following initialization), and the CPSI clock signal supplied on the line 26 will effect clocking of the first four digits of the serial data into the input register of the device 251.

When the input register within the memory device 251 is loaded with data, the flip-flop 82 within this memory device is set, which disables the NAND gate 95, and also provides a low-level output signal on the IRF output signal line 19. This low-level signal is coupled to the IES input of memory device 252, which enables the NAND gate 95 within this device. Thus, the clock signals supplied on the terminal 282 effect clocking of the next four digits of serial data into the input register of the device 252. In a similar manner, when the input register of the device 252 is full a low-level signal is supplied to the IES input 24" of the device 253. The clock signals effect clocking of the last four digits of serial data into the input register of the device 253. Once the input registers within all three devices of the array 250 are loaded, the first digit of the binary number is located in the flip-flop 83 within the device 251, and the last digit of the binary number is located in the flip-flop 86 within the device 253. Following the loading of the last four digits serially supplied on the terminal 281 into the input register in device 253, the IRF output signal from this device drops to a low level, which enables the transfer to stack operation of the combined twelve digit binary digit within the input registers of all three devices.

A possible disparity may exist in the speed of operation from device to device, which can cause a problem in the operation of a horizontal expansion array. Generally, this type of problem is solved by the use of external circuitry. However, the device of this invention employs unique internal circuitry to solve this problem. That is, the row master latch 131 (FIG. 2b) and the AND gates 124 and 125 (FIG. 2b) are employed to synchronize the operation of the device 10 in an array. In particular, the AND gate 124 is operative in row slaves (e.g., devices 252 and 253) and the AND gate 125 is operative in a row master (e.g., device 251).

AND gates corresponding to the AND gate 124 (FIG. 2b) in each of the memory devices 251 through 253 are effectively coupled together by coupling the IRF output signal line 19 to the IES input signal line 24', and coupling the IRF output signal line 19' to the IES input signal line 24". This connection effectively forms a large AND gate which assures that all devices are loaded prior to execution of the next operation. The IRF output signal line 19" of the memory device 253 in the array 250 is coupled back to the TTS inputs of all the devices in the array. Thus, the transfer to stack operation of the 12-digit binary number supplied to the array will not occur until the input register of the lowest-order device (memory device 253) has been loaded.

The IES input signal line 24 of device 251 is coupled to ground potential. Thus, the output of the inverter 98 (FIG. 2a) within the device 251 is held at a high level and the output of the inverter 122 is held at a low level. The low level output from the inverter 122 will disable the AND gate 123 and 124. When a master reset (MR) signal is supplied on the line 38 to all of the devices in the array, the output of the NOR gate 129 within the device 251 will be at a high level, and the output of the NOR gate 128 will be at a low level. However, within the devices 252 and 253 the states of the NOR gates 128 and 129 will be opposite to that within the device 251. That is, the output of the NOR gate 128 in each of the devices 252 and 253 will be at a high level, and the outputs of the NOR gate 129 in the devices 252 and 253 will be at a low level.

To compensate for a possible disparity in the speed of operation of the three devices of the array 250, the NOR gate 90 (FIG. 2b) within each of the devices will be inhibited from initializing the input registers of the respective devices. That is, the AND gate 125 within the device 251 will be disabled as a function of the state of the flip-flop 94 therein (operation in the normal manner). However, the AND gates 125 within the devices 252 and 253, will be disabled as a function of the low-level output signal from the NOR gates 129 in each of these same devices.

Flip-flop 94 within the device 251 will be reset at the same time the binary number is transferred to the data storage therein, and the AND gate 125 within the device 251 will go to a high level which will cause the output of the NOR gate 90 in this device to go to a low level. This low level output signal from the NOR gate 90 will initialize the input register within the device 251. However, within the devices 252 and 253 the input registers are initialized as a function of the IES input signal (IRF output signal from the preceeding higher order device) rising to a high level. In particular, the output of the inverters 122 (FIG. 2b) in the devices 252 and 253 will rise to a high level when the IES input signal thereto also rises to a high level. This high-level signal will enable the AND gates 124 in these two devices. The enabling of the AND gates 124 in devices 252 and 253 will cause the output of the NOR gate 90 within these devices to drop to a low level. Thus, the input registers of these devices will be initialized again. Accordingly, it may be seen that by coupling the IRF output of a high order device to the IES input of the next lower order device the input registers within the devices of the array are prevented from being initialized until the lowest order device input register has been loaded. As a result of this connection the slowest device within the array 250 will predominate over the faster devices to compensate for any possible disparity in speed of operation of the constituent devices of the array 250.

The output registers of the memory devices 251 through 253 are also interlocked logically to assure synchronization of data extraction from the array 250. The OES input of the row master device 251 is coupled to ground potential on the terminal 287, which disables the AND gate 142 (FIG. 2c). As stated hereinabove, the output of the NOR gate 129 in the master latch 131 (FIG. 2b) is at a high level in the row master device 251, which enables the AND gate 130 (FIG. 2c). Accordingly, AND gate 130 operates to set flip-flop 144 (by means of NOR gate 148) to produce a high-level ORE signal each time data is transferred from the data storage stack in device 251 to the output register thereof. This high-level ORE signal, which indicates that the output register is loaded with data, is supplied to the OES input of the row slave device 252.

In each of the row slave devices 252 and 253, the outputs of NOR gates corresponding to the NOR gate 129 (FIG. 2b) are at a low level. Thus, the AND gates corresponding to the AND gate 130 (FIG. 2c) are disabled. Consequently, the setting and resetting of flip-flops in devices 252 and 253 that correspond to flip-flop 144 is controlled by the status of the respective OES input signals supplied to these devices by means of AND gates corresponding to AND gate 142 (FIG. 2c), and not by enabling of the AND gate 130 when a nibble of data is transferred to the output register.

At a time after the MR pulse occurs, and after data are loaded into the output registers of the devices 251 through 253, a high-level signal is supplied on the ORE output line 66 of the row master device 251. This high-level signal is supplied to the OES input of the row slave device 252 which causes the flip-flop corresponding to flip-flop 144 to set. A high-level ORE output signal is supplied on line 66' from the device 252 to the OES input 54'' of the device 253, which causes the ORE output signal on line 66'' to rise to a high level. This high-level signal is supplied to the TOS inputs 42, 42' and 42'' of the devices 251 through 253, respectively, to thereby inhibit the transfer of an additional nibble of data to the output registers by inhibiting the NOR gates that correspond to the NOR gate 147 (FIG. 2c).

After the first four digit nibble of data has been serially extracted from the output register of device 251, in a manner as described hereinabove, the ORE output signal from this device drops to a low level. This low-level signal is coupled to the OES input 54' of the device 252, which disables the AND gate corresponding to AND gate 142 and enables the NOR gate corresponding to NOR gate 186. NAND gate 190 is thus enabled and the CPSO clock signals are applied to the output register flip-flops in device 252. When the four digits of data have been serially extracted from the device 252, flip-flop 144 is reset and a low-level ORE signal is supplied on the line 66' to the OES input 54'' of the device 253. In a similar manner, the device 253 is enabled for serially extracting the last four digit nibble of the 12-digit binary number from the array 250.

When the flip-flop in the device 253, which corresponds to flip-flop 144, is reset in response to extracting data from the device 253 a low-level ORE signal is supplied on the line 66'' to the TOS inputs 42, 42' and 42'' of the devices 251 through 253, respectively. This low-level signal will enable the NOR gates in all the devices which correspond to the NOR gate 147 to thereby enable transfer of the next 12-digit binary number from the data storage stacks to the output registers. Accordingly, it may be seen that data is transferred to the output registers only after all previously stored data has been extracted from the output registers of all devices in the array.

For parallel data extraction from the array 250, the CPSO clock signal supplied on the terminal 284 is held at a low level. That is, it is assumed that a user of this memory device will not extract data in serial and parallel format at the same time. Thus, during parallel data extraction the CPSO clock signal must be maintained at a low-level at the clock signal source for proper operation. All other operations of the device described hereinabove for serial data extraction are therefore substantially the same.

Figure 6:
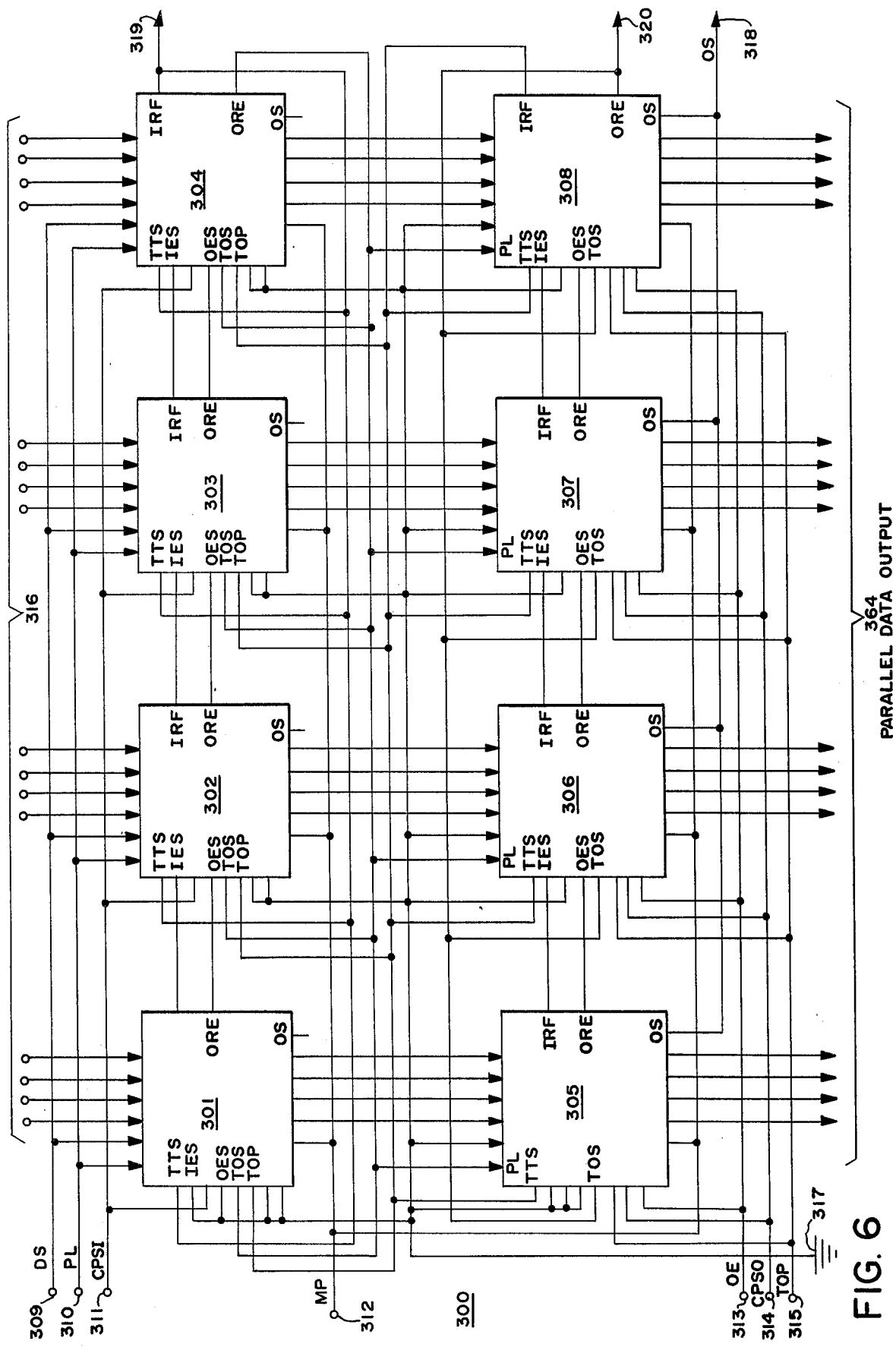
FIG. 6 is a block diagram of a combined vertical and horizontal expansion array employing the memory device of this invention.

Referring now to FIG. 6, a vertical and horizontal expansion array 300 employing the memory device 10 of this invention is shown. The memory array in FIG. 5 is illustrative of a 31 by 16 first-in first-out memory array, and is by way of illustration only and not by way of limitation. Memory devices 301 through 308 are coupled together to form the memory array 300, and each of these memory devices are identical to the memory device 10 described hereinabove. As will be shown in greater detail hereinbelow, memory devices 301 and 305 comprise row masters as a function of connections thereto, while memory devices 302 through 304 and 306 through 308 comprise row slaves.

Serial data (DS) is supplied to the array 300 on a terminal 309, and this terminal is coupled to the serial data input of each of the memory devices 301 through 304. The parallel load (PL) input signal is supplied on a terminal 310, and this terminal is coupled to the parallel load input terminals of each of the memory devices 301 through 304. The serial input clock (CPSI) input signal is supplied on a terminal 311, and this terminal is coupled to the serial input clock signal terminals of each of the memory devices 301 through 304. The master reset (MR) input signal is supplied on a terminal 312, and this terminal is coupled to a master reset input of each of the devices 301 through 308. The output enable (OE) input signal is supplied on a terminal 313, and this terminal is coupled to the OE input terminals of each of the memory devices 305 through 308. The serial output clock (CPSO) input signal is supplied on a terminal 314, and this terminal is coupled to the serial output clock terminal of each of the memory devices 305 through 308. The transfer out parallel (TOP) input signal is supplied on the terminal 315, and this terminal is coupled to the TOP input terminal of each of the memory devices 305 through 308.

A 16-digit binary number is supplied to the array 300 on a bus 316. The 16-digit binary number is divided into four 4-digit nibbles, and each 4-digit nibble is coupled to the corresponding parallel data input line 16 of the memory devices 301 through 304, respectively. The IES OES, CPSO, and OE input terminals of the device 301 are coupled to ground potential on a terminal 317. Likewise, the IES, CPSI, and OES input signal terminal of the device 305 are also coupled to ground potential on the terminal 317. As stated hereinabove, by coupling the IES input of a memory device to ground potential that memory device is established as a row master. Thus, memory devices 301 and 305 constitute row masters in the array 300.

To effectively operate the memory devices 302 through 304 on the input row of the array 300, the CPSO and OE input terminals of these devices are also coupled to ground potential on the terminal 317. Likewise, to operate the devices 306 through 308 on the output row of the array 300, the CPSI and DS inputs of these devices are also coupled to ground potential on the terminal 317.

The parallel data outputs of the memory devices 301 through 304 are coupled directly to the parallel data inputs of the memory devices 305 through 308, respectively. The serial output (OS) of the memory devices 301 through 304 are not connected, since these devices are coupled onto the input of the second row of the array. However, the serial output (OS) of the memory devices 305 through 308 are coupled together onto a single OS output line 318.

The IRF output of the memory device 301 is coupled to the IES input of the memory device 302; the IRF output of the device 302 is coupled to the IES input of the device 303; and the IRF output of the device 303 is coupled to the IES input of the device 304. The IRF output of the memory device 304 is coupled to a line 319 and to the TTS inputs of the memory devices 301 through 304. The ORE output of the device 301 is coupled to the OES input of the device 302; the ORE output of the device 302 is coupled to the OES input of the device 303; and the ORE output of the device 303 is coupled to the OES input of the device 304. The ORE output of the device 304 is coupled to the PL inputs of the devices 305 through 308, to the TOS inputs of the devies 301 through 304. The IRF and ORE outputs of the devices 305 through 308 are coupled to the IES and OES, respectively, inputs of the succeeding devices in the array in the same manner as described above. The IRF output of the device 308 is coupled to the TTS inputs of the devices 305 through 308 and to the TOP inputs of devices 301 through 304. The ORE output of the device 308 is coupled to a line 320, and to the TOS inputs of the devices 305 through 308.

Figure 7:
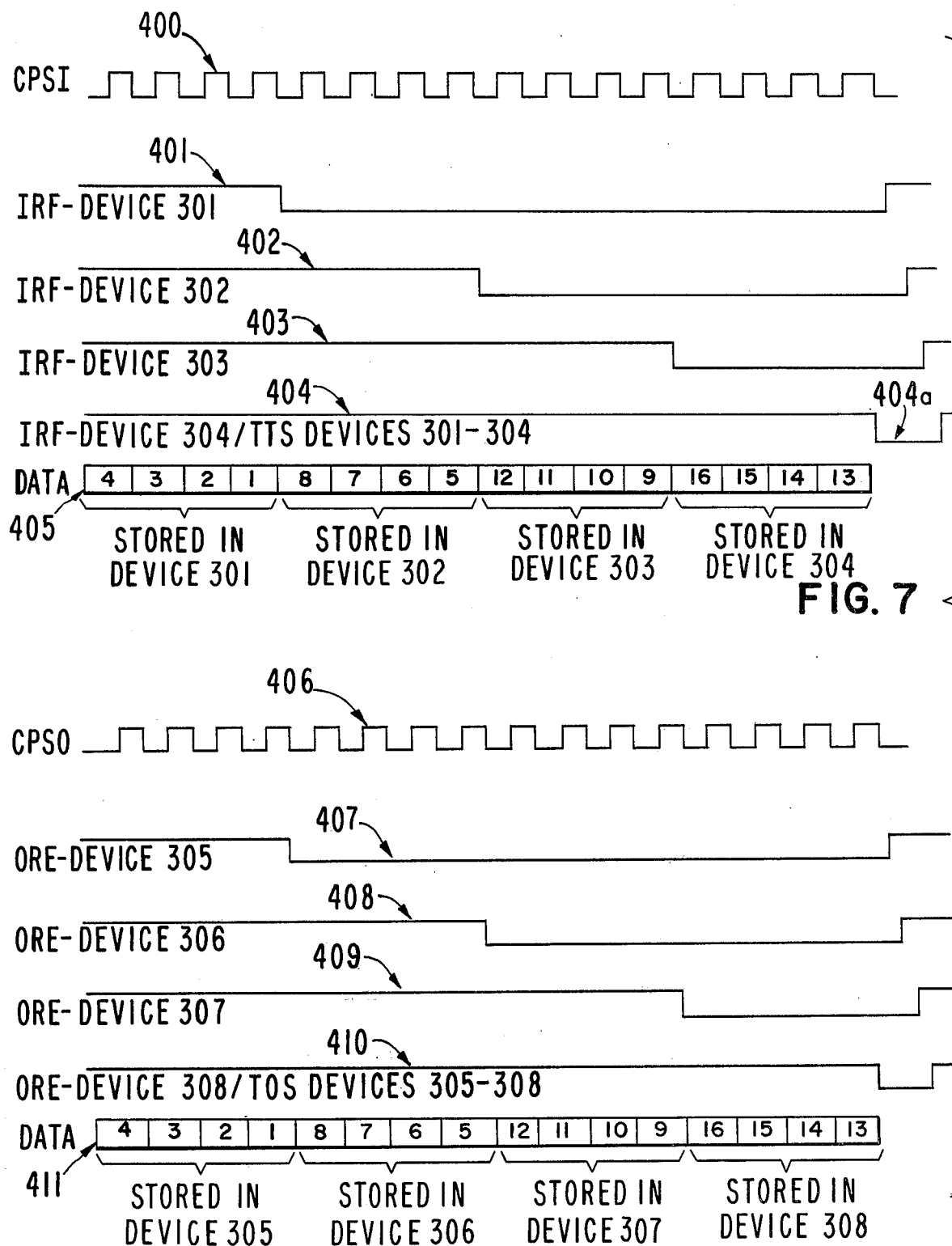
FIG. 7 is a conceptual timing diagram of the operation of the array shown in FIG. 6; and, FIG. 8 is a planar view of the memory device of this invention in integrated form.

The operation of the array 300 illustrated in FIG. 6 will be more fully understood following a description of a timing diagram illustrated in FIG. 7. Waveform 400 illustrates that the serial input clock (CPSI) supplied on the terminal 311. A 16-digit binary number is supplied serially on the terminal 309 of the DS input of each of the devices 301 through 304. The coupling of the IRF output of the device 301 to the IES input of the device 302, and so forth up to the device 304, enables serially loading of data into the combined input registers within devices 301 through 304.

Waveform 401 illustrates the IRF input signal from the device 301 after the first four digit nibble of the 16-digit binary number is loaded into the device 301. Waveform 402 illustrates the IRF output signal from the device 302 after the second four-digit nibble is loaded onto the input register of the device 302. Waveform 403 illustrates the IRF output signal from the device 303 after the third four-digit nibble is loaded into the input register of the device 303. Waveform 404 illustrates the IRF output signal from the device 304 after the fourth four-digit nibble is loaded into the input register of the device 304. The IRF output signal (waveform 404) supplied from the device 304 is also coupled to the TTS inputs of the devices 301 through 304.

Block 405 illustrates the status of the combined input registers of the devices 301 through 304 after the 16-digit binary number is loaded therein. Note that the first through the fourth binary digits are stored in the memory device 301, the fifth through the eighth binary digits are stored in the device 302, the ninth through the twelveth binary digits are stored in the devie 303, and the thirteenth through sixteenth binary digits are stored in the device 304. Also note that the first, fifth, ninth and thirteenth digits are stored in a flip-flop corresponding to flip-flop 83 within each of the devices 301 through 304.

Waveform 406 represents the serial output clock (CPSO). Waveform 407 represents the ORE output signal from the device 305; waveform 408 represents the ORE signal from the device 306, waveform 409 represents the ORE output from the device 307; and, waveform 410 represents the ORE output signal from the device 308. The ORE output signal from the device 308 (waveform 410) is also supplied to the TOS input terminals of the device 305 through 308. Block 411 represents the combined 16-digit binary number stored in the output registers of the devices 305 through 308. The first through the fourth binary digits are extracted from the device 305 in response to the CPSO clock signal (waveform 406), and are supplied on the line 318 from the array 300. Note that the first digit of the 16-digit binary number is stored in the output register flip-flop 167 of the device 305. Thus, the first digit of the binary number is extracted first.

When the output register within the device 305 is empty the ORE output signal (waveform 407) therefrom drops to a low level. In a like manner the fifth through the eighth digits are extracted from the device 306 and supplied on the line 318; the ninth through the twelveth digits are next supplied on the line 318 from the device 307; and, finally the thirteenth through sixteenth digits are supplied on the line 318 from the device 308. Note that the digits are extracted serially from the combined output register of the array 300 in the proper order notwithstanding the irregular pattern of storage in the input and output registers (blocks 405 and 411, FIG. 7). When the sixteenth digit is extracted from the output register within the device 308, the ORE output signal from this device drops to a low level (waveform 410), which allows the transfer of the next 16-digit binary number into the combined output registers of the devices 305 through 308.

Note that it is possible to coupled the serial data output (OS) lines of devices 305 through 308 together because the driving gate (180 in FIG. 2c) in each of the devices is a three-state device. When the flip-flop corresponding to flip-flop 144 (FIG. 2c) of a memory device is cleared, NAND gates corresponding to NAND gate 180 in that memory device will be a high impedance state.

Figure 8:
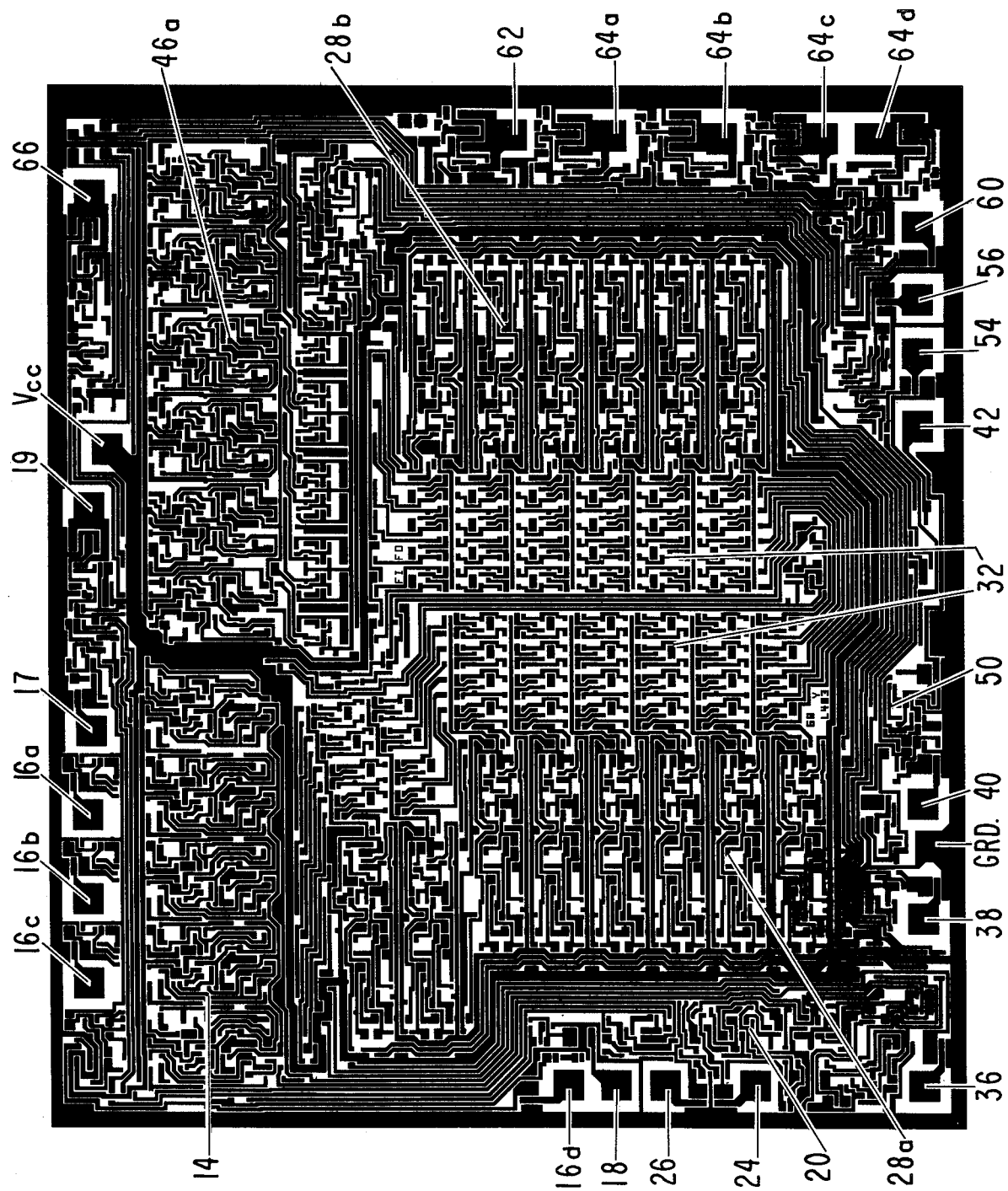

Referring now to FIG. 8, a photolithographic print is shown of the metallization pattern of a single semiconductor chip 420 comprising the memory device 10 of this invention. Like reference numerals are employed in FIG. 8 to identify the components illustrated and described hereinabove. All pin connections are labeled with reference numerals corresponding to all the input and output line reference numerals of the aforedescribed memory device 10. The ground pin connection is identified by "ground", and the voltage supply pin is identified by "$V_{cc}$".

The input register 14, the input control circuit 20, the data storage stack 32 and the output control circuit 50 are each identified generally by like reference numerals with associated lead lines. The stack control circuit 28 is divided into two parts in the integrated circuit, which parts are identified by reference numerals 28a and 28b with associated lead lines. Similarly, the output register and gating circuit 46 is identified by reference numeral 46. Accordingly, it may be seen that a single chip first-in first-out memory device is provided which is universal in array applications.

We claim:

1. A single chip large scale integration device having a set of data input pins, a set of data output pins, and control signal input pins, of a first-in first-out memory, comprising:
   a. input means having control input terminals, data input terminals coupled to the data input pins of said device, and data output terminals, said input means being disposed for accepting data from an outside source on said data input pins;
   b. a data storage means having data input terminals coupled to said data output terminals of said input means and having data output terminals, said data storage means comprising an asynchronous circuit having a multiplicity of sets of individual storage devices and each of said sets of individual storage devices being adapted for accepting data only when in a neutral state;
   c. output means having control input terminals, data input terminals coupled to said data output terminals of said storage means, and data output terminals coupled to the data output pins of said device; and
   d. circuit means having input terminals coupled to the control signal input pins of said device, and output terminals coupled to said control input terminals of said input and output means for independently controlling the loading of data into an extraction of data from said memory, whereby data loaded into said input means asynchronously flows through said data storage means as a function only of data extracted from said output means.

2. A single chip large scale integration device as in claim 1 further characterized by said input means being adapted for receiving data in serial format.

3. A single chip large scale integration device as in claim 1 further characterized by said input means being adapted for receiving data in parallel format.

4. A single chip large scale integration device as in claim 1 further characterized by said output means being adapted for serial data extraction therefrom.

5. A single chip large scale integration device as in claim 1 further characterized by said output means being adapted for parallel data extraction.

6. A single chip large scale integration device as in claim 1 further characterized by an output pin of said device being coupled to a status output terminal of said input means for supplying a bilevel status output signal indicating when said input means contains data and when said input means is in a neutral state.

7. A single chip large scale integration device as in claim 1 further characterized by an output pin of said device being coupled to a status output terminal of said output means for supplying a bilevel signal indicating when said output means contains data and when said output means is in a neutral state.

8. N single chip large scale integration devices as defined in claim 1, each electrically coupled together to form a memory array for storing M-digit binary numbers, wherein M and N are integers greater than one, further characterized by said circuit means including a bistable circuit means disposed for interlocking the operation of said array as a unitary memory, so that the Nth one of said devices functions as a master device in said array in response to a first state of said bistable circuit means and the complement of said devices in said array functions as slaves to said master device in response to a second state of said bistable circuit means.

9. An array of N single chip large scale integration devices as defined in claim 8 further characterized by each device in said array including a first status output pin coupled to a status output terminal of said input means in each device in said array, respectively for supplying a first bilevel signal indicating when said input means contains data and when said input means is in a neutral state.

10. An array of N single chip large scale integration devices as defined in claim 9 further characterized by each device in said array including a second status output pin coupled to a status output terminal of said output means in each device in said array, respectively, for supplying a second bilevel signal indicating when said output means contains data and when said output means is in a neutral state.

of each device, beginning with device N—(N—1) up to device N—1, being coupled to said data input pins of each adjacent device, beginning with device N—(N—2) up to device N, thereby coupling together all devices in said array.

22. N memory devices as in claim 21 further characterized by said first control input pin of device N—(N—1) being coupled to a control input terminal of said array, said first status output pin of device N—(N—1) being coupled to said fourth control input pin of the same device, said second status output pin being coupled to said third control input pin of the same device and to said first control input pin of device N—(N—2), said first status output pin of device N—(N—2) being coupled to said fourth control input pin of the same device and to said second control input pin of device N—(N—1), said first status output pin of each subsequent device up to device N coupled to said fourth control input pin of the same device and to the second control input pin of the previous adjacent device, said second status output pin of each device up to device N—1 being coupled to said third control input pin of the same device and to said first control input pin of the next adjacent device in said array, said second status output pin of device N being coupled to said third control input pin of the same device and to a status output of said array, and said second control input pin of device N being coupled to a control input terminal of said array.

* * * * *

UNITED STATES PATENT OFFICE
CERTIFICATE OF CORRECTION

PATENT NO. : 3,972,034
DATED : July 27, 1976
INVENTOR(S) : Derickson, III, et al It is certified that error appears in the above-identified patent and that said Letters Patent are hereby corrected as shown below:

Column 24, Claim 1, line 10, "an" should read -- and -- .

Column 25, Claim 18, line 65, after "terminals" insert -- , -- .

Column 26, Claim 19, line 36, "othe" should read -- other -- .

Signed and Sealed this

Thirteenth Day of May 1980

[SEAL]

Attest:

SIDNEY A. DIAMOND

Attesting Officer

Commissioner of Patents and Trademarks